(12) United States Patent
Krishnaswamy et al.

(10) Patent No.: US 11,749,281 B2
(45) Date of Patent: Sep. 5, 2023

(54) NEURAL SPEECH-TO-MEANING

(71) Applicant: SoundHound, Inc., Santa Clara, CA (US)

(72) Inventors: Sudharsan Krishnaswamy, San Jose, CA (US); Maisy Wieman, Boulder, CO (US); Jonah Probell, Alviso, CA (US)

(73) Assignee: SoundHound AI IP, LLC, Santa Clara, CA (US)

( * ) Notice: Subject to any disclaimer, the term of this patent is extended or adjusted under 35 U.S.C. 154(b) by 503 days.

(21) Appl. No.: 16/703,783

(22) Filed: Dec. 4, 2019

(65) Prior Publication Data

US 2021/0174806 A1  Jun. 10, 2021

(51) Int. Cl.
G10L 15/26 (2006.01)
G06F 3/16 (2006.01)
G10L 15/18 (2013.01)
G10L 15/183 (2013.01)
G10L 15/22 (2006.01)
G10L 15/30 (2013.01)

(52) U.S. Cl.
CPC .............. G10L 15/26 (2013.01); G06F 3/167 (2013.01); G10L 15/183 (2013.01); G10L 15/1815 (2013.01); G10L 15/22 (2013.01); G10L 15/30 (2013.01); *G10L 2015/223* (2013.01)

(58) Field of Classification Search
CPC ... G10L 15/00; G10L 15/1815; G10L 15/183; G10L 15/22; G10L 15/26; G10L 15/30; G10L 2015/223; G06F 3/00; G06F 3/167
See application file for complete search history.

(56) References Cited

U.S. PATENT DOCUMENTS 10,283,111 B1 * 5/2019 Mairesse ................. G10L 15/22
2008/0215322 A1   9/2008 Fischer et al.
2014/0278424 A1   9/2014 Deng
2014/0365216 A1   12/2014 Gruber
(Continued)

FOREIGN PATENT DOCUMENTS

WO   2017091883 A1   6/2017

OTHER PUBLICATIONS

Oliver Bender, Franz Josef Och, and Hermann Ney. "Maximum entropy models for named entity recognition." In Proceedings of the seventh conference on Natural language learning at HLT-NAACL 2003—vol. 4 (CONLL '03). Association for Computational Linguistics, USA, 148-151. 2003 (Year: 2003).*
(Continued)

*Primary Examiner* — Paras D Shah
*Assistant Examiner* — Sean E Serraguard
(74) *Attorney, Agent, or Firm* — Vierra Magen Marcus LLP

(57) ABSTRACT

A neural speech-to-meaning system is trained on speech audio expressing specific intents. The system receives speech audio and produces indications of when the speech in the audio matches the intent. Intents may include variables that can have a large range of values, such as the names of places. The neural speech-to-meaning system simultaneously recognizes enumerated values of variables and general intents. Recognized variable values can serve as arguments to API requests made in response to recognized intents. Accordingly, neural speech-to-meaning supports voice virtual assistants that serve users based on API hits.

24 Claims, 14 Drawing Sheets

(56) References Cited

U.S. PATENT DOCUMENTS

| | | | |
|---|---|---|---|
| 2017/0083586 A1 | 3/2017 | Huang et al. | |
| 2017/0178626 A1* | 6/2017 | Gruber | G06F 40/30 |
| 2017/0287465 A1 | 10/2017 | Zhao | |
| 2018/0061394 A1 | 3/2018 | Kim | |
| 2018/0358005 A1* | 12/2018 | Tomar | G10L 15/22 |
| 2019/0066668 A1* | 2/2019 | Lin | G10L 15/1815 |
| 2019/0132451 A1 | 5/2019 | Kannan | |
| 2019/0138269 A1 | 5/2019 | Dolph | |
| 2019/0179890 A1* | 6/2019 | Evermann | G06F 40/35 |
| 2019/0251952 A1 | 8/2019 | Arik | |
| 2019/0281159 A1 | 9/2019 | Segalis | |
| 2020/0035228 A1* | 1/2020 | Seo | G06F 40/295 |
| 2020/0103963 A1 | 4/2020 | Kelly et al. | |
| 2020/0410976 A1 | 12/2020 | Zhou | |
| 2021/0074295 A1 | 3/2021 | Moreno et al. | |
| 2021/0082406 A1* | 3/2021 | Kim | G06N 3/0445 |
| 2021/0225357 A1* | 7/2021 | Zhao | G10L 25/63 |

OTHER PUBLICATIONS

D. Serdyuk, Y. Wang, C. Fuegen, A. Kumar, B. Liu and Y. Bengio, "Towards End-to-end Spoken Language Understanding," 2018 IEEE International Conference on Acoustics, Speech and Signal Processing (ICASSP), pp. 5754-5758, 2018 (Year: 2018).*

Jisung Wang, Speech Augmentation Using Wavenet in Speech Recognition. InICASSP 2019-2019 IEEE International Conference on Acoustics, Speech and Signal Processing (ICASSP) May 1, 20192 (pp. 6770-6774). IEEE.

Rohit Prabhavalkar, A Comparison of Sequence-to-Sequence Models for Speech Recognition. InInterspeech Aug. 2017 (pp. 939-943).

Homa B Hashemi, Query intent detection using convolutional neural networks. InInternational Conference on Web Search and Data Mining, Workshop on Query Understanding 2016.

Xiaodong Liu, Multi-task deep neural networks for natural language understanding. arXiv preprint arXiv: 1901.11504 Jan. 31, 2019.

Ashish Vaswani, Attention is all you need. InAdvances in neural information processing systems 2017 (pp. 5998-6008).

Neil Zeghidour, End-to-end speech recognition from the raw waveform. arXiv preprint arXiv:1806.07098. Jun. 19, 2018.

Yanzhang He, Streaming End-to-end Speech Recognition for Mobile Devices. InICASSP 2019-2019 IEEE International Conference on Acoustics, Speech and Signal Processing (ICASSP) May 12, 2019 (pp. 6381-6385). IEEE.

Kuo, Hong-Kwang J., Zoltán Tuske, Samuel Thomas, Yinghui Huang, Kartik Audhkhasi, Brian Kingsbury, Gakuto Kurata, Zvi Kons, Ron Hoory, and Luis Lastras. "End-to-End Spoken Language Understanding Without Full Transcripts." arXiv preprint arXiv:2009.14386 (2020).

Liu, Bing, and Ian Lane. "Attention-based recurrent neural network models for joint intent detection and slot filling." arXiv preprint arXiv: 1609.01454 (2016).

Zhang, Chenwei, Yaliang Li, Nan Du, Wei Fan, and Philip S. Yu. "Joint slot filling and intent detection via capsule neural networks." arXiv preprint arXiv:1812.09471 (2018).

Jisung Wang, Speech Augmentation Using Wavenet in Speech Recognition. InICASSP 2019-2019 IEEE International Conference on Acoustics, Speech and Signal Processing (ICASSP) May 12, 2019 (pp. 6770-6774). IEEE.

Hong-Kwang J Kuo et al: End-to-End Spoken Language Understanding Without Full Transcripts, arxiv.org, Sep. 30, 2020 (Sep. 30, 2020.

Bing Liu et al: Attention-Based Recurrent Neural Network Models for Joint Intent Detection and Slot Filling, Interspeech 2016, Sep. 8, 2016 (Sep. 8, 2016), pp. 1-5, XP080724506, DOI: 10.21437/Interspeech.2016-1352.

Alex Graves, Neural Turing machines. arXiv preprint arXiv: 1410.5401. Oct. 20, 2014.

Anonymous, Artificial Design: Modeling Artificial Super Intelligence with Extended General Relativity and Universal Darwinism via Geometrization for Universal Design Automation.

Ashish Vaswani, Attention is all you need. InAdvances in neural information processing systems 2017 (pp. 0998-6008).

Bing Liu, Joint online spoken language understanding and language modeling with recurrent neural networks. arXiv preprint arXiv:1609.01462. Sep. 6, 2016_.

Chen, Qian, Zhu Zhuo, and Wen Wang. "Bert for joint intent classification and slot filling_" arXiv preprint arXiv: 1902.10909 (2019).

Chenwei Zhang, Joint slot filling and intent detection via capsule neural networks_arXiv preprint arXiv:1812.09471. Dec. 22, 2018.

Coucke, Alice, Alaa Saade, Adrien Ball, Theodore Bluche, Alexandre Caulier, David Leroy, Clement Doumouro et al. Snips voice platform: an embedded spoken language understanding system for private-by-design voice interfaces. arXiv preprint arXiv:1805.10190 (2018).

Douglas Coimbra De Andrade, A neural attention model for speech command recognition. arXiv preprint arXiv: 1808 08929_ Aug. 27, 2018.

Dzmitry Bahdanau, Neural machine translation by jointly learning to align and translate_arXiv preprint arXiv:1409.0473.

Homa B Hashemi, Query intent detection using convolutional neural networks. In International Conference on Web Search and Data Mining, Workshop on Query Understanding 2016.

James Kirkpatrick, Overcoming catastrophic forgetting in neural networks. Proceedings of the national academy of sciences Mar. 28, 2017;114(13):3521-6.

Kiaodong Liu. Multi-task deep neural networks for natural language understanding. arXiv preprint arXiv: 1901.11504 Jan. 31, 2019.

Neil Zeghidour, End-to-end speech recognition from the raw waveform. arXiv preprint arXiv:1806.07098. Jun. 19, 2018.

Oriol Vinyals, Grammar as a foreign language_InAdvances in neural information processing systems 2015 (pp. 2773-2781).

Shah, Darsh J., Raghav Gupta, Amir A_Fayazi, and Dilek Hakkani-Tur. "Robust zero-shot cross-domain slot filling with example values." arXiv preprint arXiv: 1906.06870 (2019).

Shiyu Chang, Dilated recurrent neural networks. InAdvances in Neural Information Processing Systems 2017 (pp. 77-87).

Tara N Sainath, Learning the speech front-end with raw waveform CLDNNs. In Sixteenth Annual Conference of the International Speech Communication Association 2015.

Victor Zhong, Seq2sql: Generating structured queries from natural language using reinforcement learning. arXiv preprint arXiv:1709.00103. Aug. 31, 2017.

Y.-P. Chen, R. Price and S. Bangalore, "Spoken Language Understanding without Speech Recognition," 2018 IEEE International Conference on Acoustics, Speech and Signal Processing (ICASSP), 2018, pp. 6189-6193, doi: 10.1109/CASSP.2018.8461718. (Year: 2018).

Yanzhang He, Streaming End-to-end Speech Recognition For Mobile Devices. In ICASSP 2019-2O19 IEEE International Conference on Acoustics, Speech and Signal Processing (ICASSP) May 12, 2019 (pp. 6381-6385) IEEE.

Zoltan Tuske, Acoustic modeling with deep neural networks using raw time signal for LVCSR. In Fifteenth annual Conference of the international speech communication association 2014.

* cited by examiner

NEURAL SPEECH-TO-MEANING

FIELD OF THE INVENTION

The present invention is in the field of natural language understanding using neural network machine learning.

BACKGROUND

FIG. 1 shows the architecture of a conventional virtual assistant with a voice interface. The virtual assistant receives captured speech audio from a source such as a microphone or packets of audio data over a network. The virtual assistant performs automatic speech recognition (ASR) 101 on the captured speech audio to produce a transcription. Some produce a set of multiple transcription hypotheses, each having a probability score. The virtual assistant of FIG. 1 performs natural language understanding (NLU) 102 on the transcription or does so in multiple instances on transcription hypotheses. NLU produces an intent. That is a data structure having information on which the virtual assistant can act to assist a user.

The virtual assistant makes a decision as to when the user has made a complete expression with a complete intent. We will call that a hit. Some virtual assistants determine that a hit has occurred when a user stops speaking for a sufficient amount of time. This is called end-of-utterance (EOU) detection. Some virtual assistants instead or also determine a hit based on the apparent completeness of an expression according to NLU.

The virtual assistant of FIG. 1, after determining that a hit has occurred, promptly does something 103 that would likely be useful to the user given the expressed intent. The something is any kind of function appropriate for responding to the intent. For example, a virtual assistant might perform a web application programming interface (API) call, such as by using the HTTP protocol, to a source of data 104 on the internet. This is useful, for example, for looking up the weather forecast. For another example, the virtual assistant might perform an action such as sending a message with words contained in the intent or causing a robot to physically move. The function can be defined in a software development kit (SDK), where an API access is one example of an appropriate function call.

The virtual assistant of FIG. 1, after doing something, produces a response to the user. This can include data from an API access, acknowledgment of an action, any other relevant information. The virtual assistant performs text-to-speech (TTS) 105 to synthesize speech audio. The response can include indications of prosody for the synthesized speech in order to emphasize certain words and deliver a desirable speech style. Conventional systems include a lot of complex technology in the ASR and NLU components that, collectively, receive speech audio and produce an intent and hit signal.

FIG. 2 shows conventional components within an ASR function. An acoustic model 201 receives audio, partitions it into frames, and performs digital signal processing (DSP) to convert audio samples to spectral energy values within the frames. Older systems used hidden Markov models (HMMs) on the spectral data. Newer systems use neural network (NN) models 202. Other approaches are possible. The acoustic model produces phoneme sequence hypotheses and an acoustic score for each hypothesis.

In a process of tokenization 203, ASR for alphabetic languages check the phoneme sequence hypotheses against a pronunciation dictionary 204 that includes one or more pronunciation for each word. For full language transcription, pronunciation dictionaries might have 1 million or more words. For application-specific systems, the dictionary can be smaller. Tokenization produces word sequence hypotheses made up of sequences of words that comprise the hypothesized sequence of phonemes in order. Non-alphabetic languages, such as Chinese languages, instead of tokenization according to a dictionary, assemble phonemes into pronunciations of characters in order. Whether characters or words, the result is token sequence hypotheses.

A statistical language model (SLM) 205 uses the token sequence hypotheses and the acoustic scores corresponding to the phoneme sequence hypotheses from which the token sequence hypotheses are derived and computes a probability score for each token sequence hypothesis. The probability score is based on the frequency with which the sequence of tokens is likely to appear in the language, weighted by the probability of the token sequence according to the acoustic score. In systems such as ones for long-form dictation, the output of ASR is the transcription hypothesis with the single highest SLM score. In virtual assistants that perform NLU, ASR can output multiple transcription hypotheses and their corresponding scores, each of which can be processed to compute the most probable intent. SLMs are trained on corpora of examples of language usage. Older SLMs used n-gram models 206, which computes probabilities of sequences of N number of tokens. Typically, N is 3 or 4 but can be less or more. More modern SLMs use NN models, and particularly ones with long-term recurrence such as long short-term memory (LSTM) NNs. These learn to give weight to long-prior tokens in proportion to their discriminative value.

FIG. 3 shows the components of conventional NLU. It receives transcriptions. These can be a multiplicity of transcriptions hypotheses from ASR or a single transcription such as one input as text such as from a keyboard. The transcription hypotheses are compared to grammars 301. Grammars include phrasings and slots. Slots are place holders for information that can be filled from lists of possible values. For example, the name of a place is useful for a grammar related to weather. A time can be a slot value. A slot value can also be any arbitrary number, such as for a grammar that performs calculations.

Phrasings within grammars can be expressed in various specific formats such as regular expression format, or proprietary formats. FIG. 3 shows an example grammar with the phrasing "what's the weather [going to be] in <PLACE> [on] <TIME>". This is written in a format the considers square bracketed text to be optional and angle bracketed text to be slot values. Therefore, the example matches the transcription "what's the weather in Chicago on Wednesday" and "what's the weather going to be in Miami next week". Some virtual assistants group grammars based on the domains of knowledge that they can address. However, domain groupings 302 are not necessary for normal function.

Grammars produce intents and scores. For example, the grammar shown in FIG. 3 will produce an intent with a weather API universal resource locator (URL) that includes arguments filled with the PLACE and TIME slot values. Grammars also can give scores based on the probability of particular phrasings. For example, the English sentence "what's the weather going to be in Boston on yesterday" is an awkward way of speaking and somewhat non-sensical to use the future tense indicator "going to be" with a past tense time "yesterday". As a result, a grammar might give that sentence a low score whereas "what's the weather in Seattle currently" would match the grammar with a meaningful intent and high grammar score.

A virtual assistant NLU component selects 303 the intent with the highest grammar score. A voice virtual assistant chooses the intent with the highest grammar score as weighted by the SLM score, which itself is weighted by the acoustic score. Other score components are possible in various virtual assistants' designs.

Some virtual assistants store conversation state 304. Among other information, this includes slot values. As a result, a query "what's the weather in Seattle" stores Seattle as the value of a PLACE slot. A following query using a pronoun "there", such as "how long would it take to drive there" fills the PLACE slot with the value Seattle since it was the most recently mentioned place. As a result, such a virtual assistant can understand speech expressed in natural styles.

The Problem

Conventional systems have a lot of components. Some components are designed by smart engineers using the best available research. It is always improving, but never perfect. Some components of conventional systems are trained from large corpora of data. The amount of data is finite, and a corpus used for training a system is never a perfect match for the future use of the system. Every component of the system has inaccuracy, which loses useful information throughout the pipeline. Much effort goes into improving each stage individually and much effort goes into making the stages interact with each other well. However, those efforts need to be different and therefore repeated for each human language based on their peculiarities. Furthermore, they need to be done differently based on the application, such as ones with few or many domains, large or small vocabularies, power-sensitive or latency-critical, and to meet other application-specific constraints.

Acoustic data is expensive. Text word statistics are an imperfect match for speech. Corpora for domain-specific language models are difficult/impossible/expensive. Domain grammars require programming skills. The more powerful the grammar language, the more advanced the skills needed. The more domain grammars a system has, the more fine-tuning is needed to decipher the ambiguity of natural human speech.

Engineers' salaries are astronomically expensive to spend on such fine-tuning.

The state of the art has demonstrated acceptable accuracy for "end-to-end" transcription without AM or LM. But text is not the end for a virtual assistant. The end is an actionable expression of the intent of the speech, such as NLU grammars produce.

SUMMARY

The present invention provides a unitary system for extracting meaning from speech audio. The input is digitized speech audio. Some systems take in time domain representations and some take in frequency domain representations. The output is a data structure representing an intent. The data structure is in a format that, with little further processing, provides the input needed for a function that performs an action or reads a data value. An optional output is a hit signal that indicates that the speaker has completed an expression.

Some systems comprise a main intent recognizer and one or more variable recognizer. Intent recognizers detect the completion of an expression having a certain type of intent. Variable recognizers are useful for systems that support complex expressions that have entity values such as place names or numbers. Variable recognizers take in the speech audio and output an indication of which enumerated value of the variable is recognized. Variable recognizers optionally output a signal that indicates that an enumerated value of the variable has been detected. Variable values are useful in many systems as the arguments for the intent data structure output. Some intent recognizers may use the detection of an enumerated value of a variable as an input to inform detection of a complete intent.

Some systems may have multiple or many intent recognizers and multiple or many variable recognizers. The outputs of some types of variable recognizers can inform multiple intent recognizers and some intent recognizers can observe the output of multiple variable recognizers.

Some systems treat groups of related intent recognizers as domains. Such systems may optionally include a domain recognizer that takes in speech audio and outputs an indication of which of a plurality of domains to which the speech refers.

Recognizers may be implemented based on neural networks trained on speech audio to produce a hit output and variable value outputs. Intent recognizers may be trained on multiple phrasings of the same intent, including phrasings in any number of human languages. To reduce data collection time and cost, variable recognizers can be trained on generated speech audio.

Some systems offer recognizers for natural language understanding as a service through a platform either alone or as part of a virtual assistant capability.

Interactions between devices that capture audio and recognizer services can be through network connections, including wireless connections. Many systems are implemented using software instructions stored on storage media such that when a processor executes the instructions it performs methods and behaves as systems described and claimed herein.

DETAILED DESCRIPTION

Figure 1:
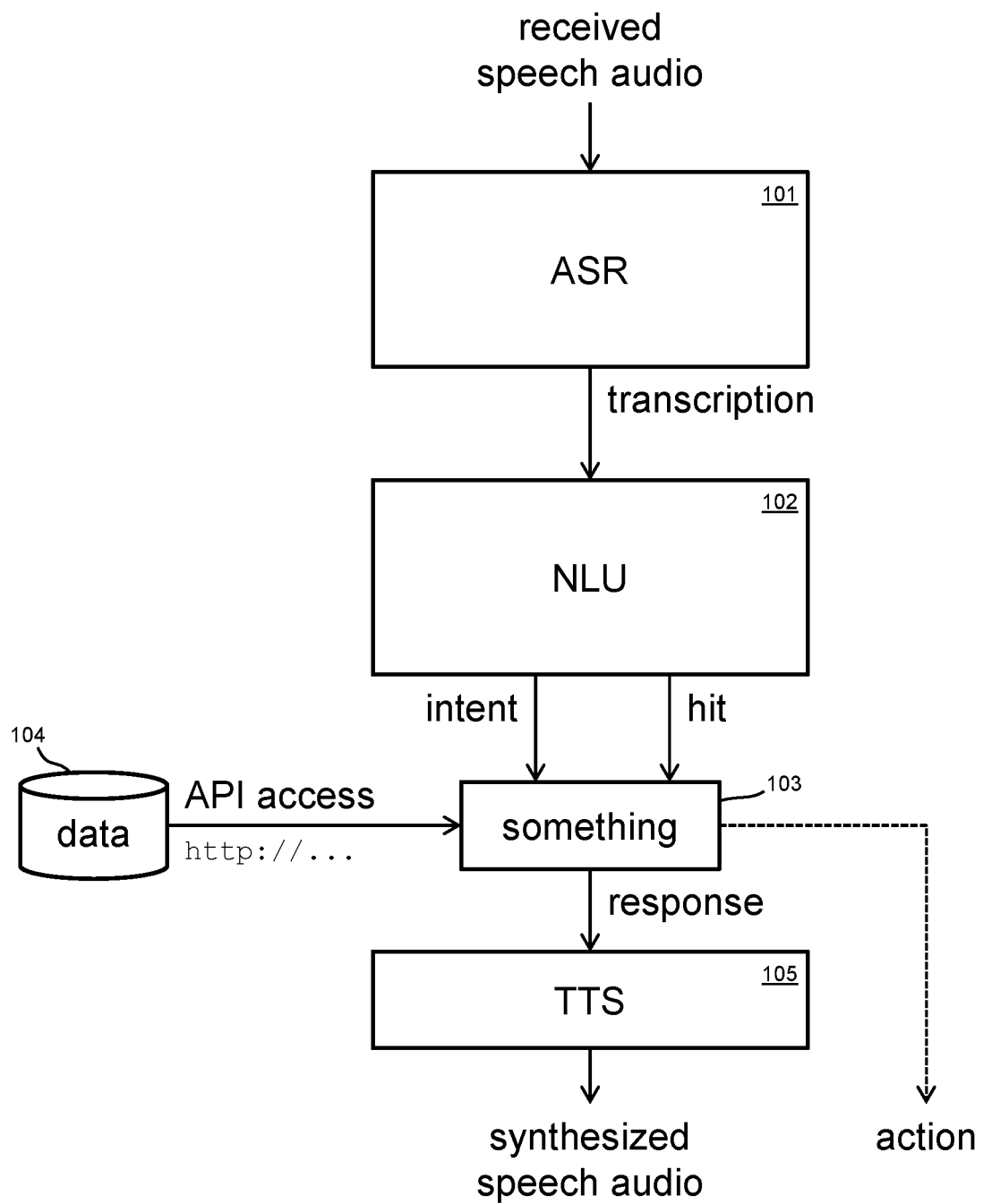
FIG. 1 shows a diagram of a speech-controlled system.
Figure 2:
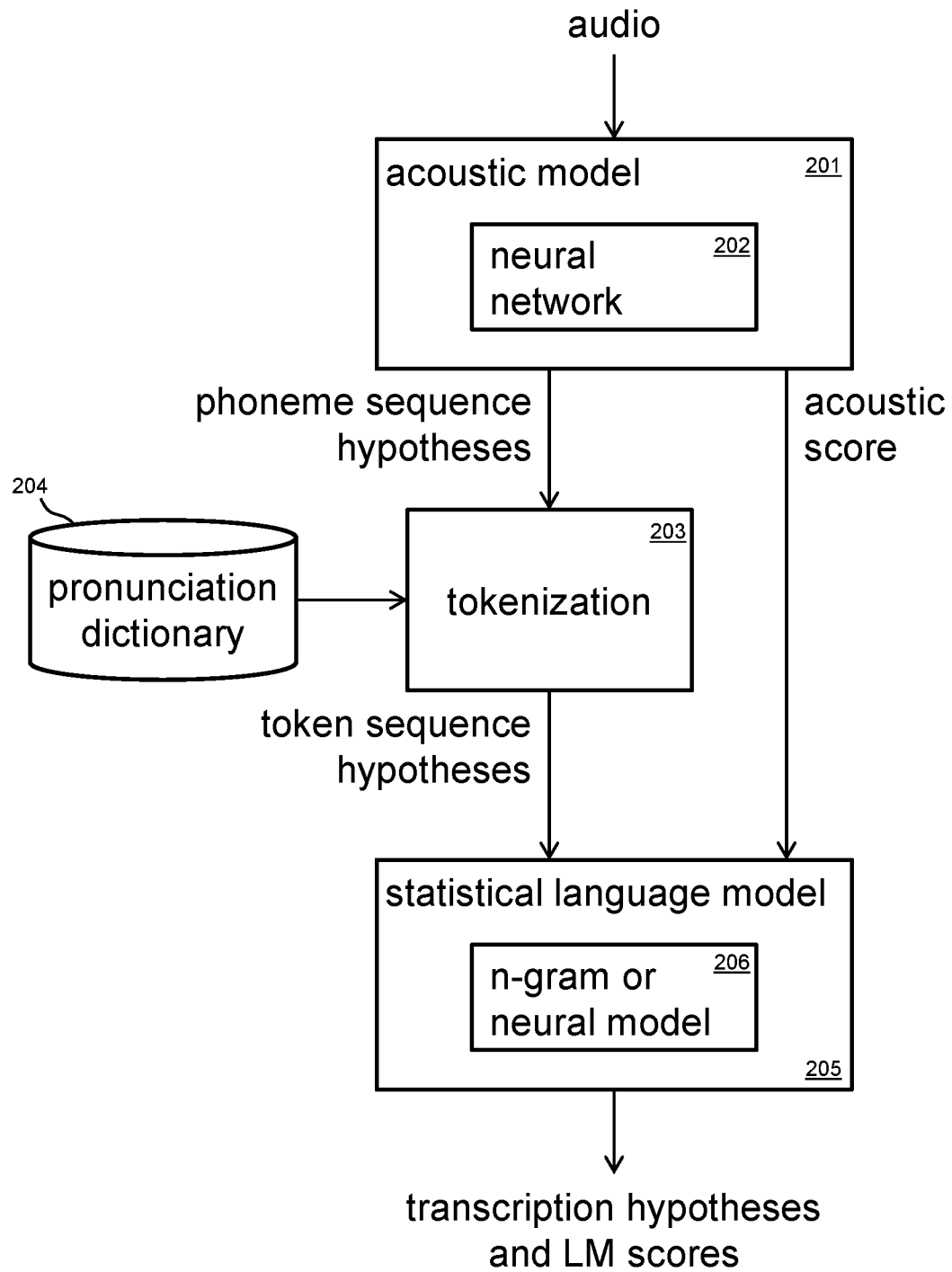
FIG. 2 shows a diagram of a speech-to-text process.
Figure 3:
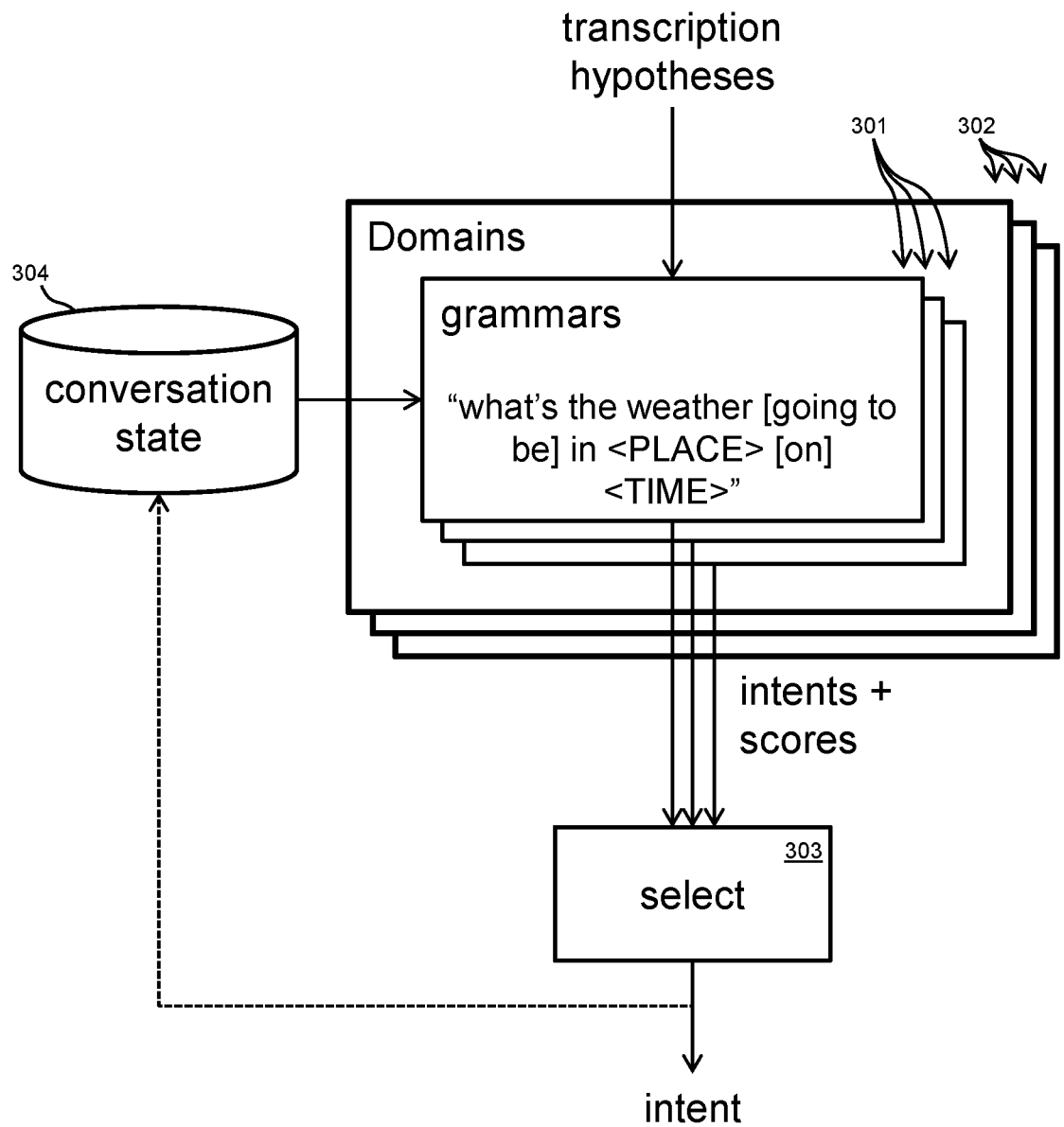
FIG. 3 shows a diagram of a natural language understanding process.

The following describes various embodiments of claimed inventions. The described embodiments have various components. Some components have alternative design choices. Some components are optional. The following description is not necessarily explicit about whether each component is optional, whether design choices have alternatives, and what all possible alternatives are. The following description gives examples, from which ordinarily skilled practitioners will understand the described inventions and the claims. The following description uses the word system to describe machines and methods and at different levels such that one system might be a component of another system.

Intents

An intent is a request that has a specific expected type of response. Many verbal phrasings can have the same intent. For example, "what's the time" and "what time is it" are two phrasings with the same intent. Systems can represent intents as structured data. Structured data can be represented in specific schemas using formats such as JSON or XML. In systems that function using API calls, an intent can be represented as (a) a set of arguments for an API request and (b) in some cases, a selection of which information from an API response is interesting to the user.

In general, the more detailed capabilities of a system, the fewer phrasings there are for each intent. A time-telling system that only gives one kind of response gives that response for phrasings "what time is it", "what hour is it", and "what minute is it", but a time-telling system with capabilities to report the full time, just the hour, or just the minute has three intents, each of which responds on only one of those phrasings.

Some systems can respond to many intents that are the same but for one or a small number of variable pieces of information. For example, a system that can report the weather in any of many different cities can have many different intents. However, due to practical limitations on collecting data and training a system, it is more efficient to design it with one intent that includes a variable where the variable can have any of the many specific values.

A general intent data structure is one that has placeholders for variables if the intent has variables. A specific intent data structure is one that specifies specific values for each variable.

API Example

Many virtual assistants retrieve information of interest to a user by accessing ("hitting") an API. Many modern APIs use a Representational State Transfer (REST) style. This is typically done through a program such as command-line URL (curl) or a web framework such as Flask.

In an example request to an API for procuring weather information. The request has a URL addressing a domain such as openweathermap.org with a query argument value London.

This is an example response to an API hit with the URL above.

temp: 286.67
temp_min: 281.556
temp_max: 286.67
pressure: 972.73
humidity: 75
description: "clear sky"
wind speed: 1.81
wind direction: 247.501
dt_txt: "2017-02-16 12:00:00"
city: "London"

The response comprises more information about the weather than a user usually wants, and the information is formatted differently. A useful virtual assistant, responding to the intent of a user's question, would, therefore, provide a resulting verbal user response such as, "the weather in London is 14 degrees Celsius with clear skies". Note that 286.67 degrees kelvin is 13.52 degrees Celsius.

Many API hits involve accessing a data source over a network. Generally the data is on a server and the virtual assistant performing the API hit is a client. Devices that contain virtual assistants may include network client hardware and/or software functionality.

Output and Input

Figure 4:
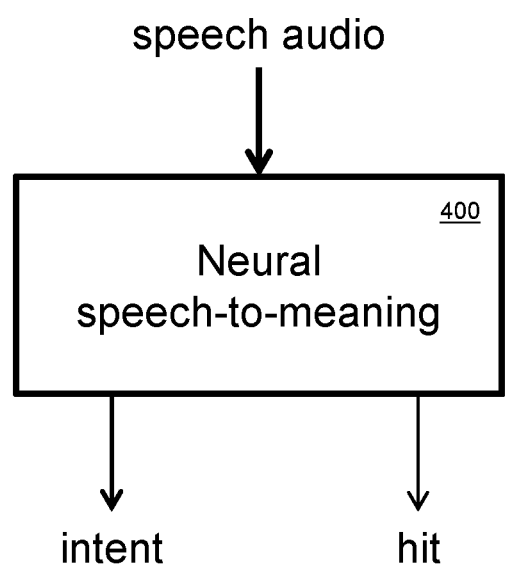
FIG. 4 shows a black box view of neural speech-to-meaning.

FIG. 4 shows an overview of the input and outputs of a neural speech-to-meaning system 400. An output is an intent data structure in a form similar to ones described above. The output may vary effectively continuously over time as a system runs. It may also be registered at particular times when a system hypothesizes that a user expression is complete. In such a case, there may be an additional signal indicating that a hit has occurred. The hit signal might be continuously varying or might emit a pulse at times of hypothesizing complete expressions.

Figure 5A:
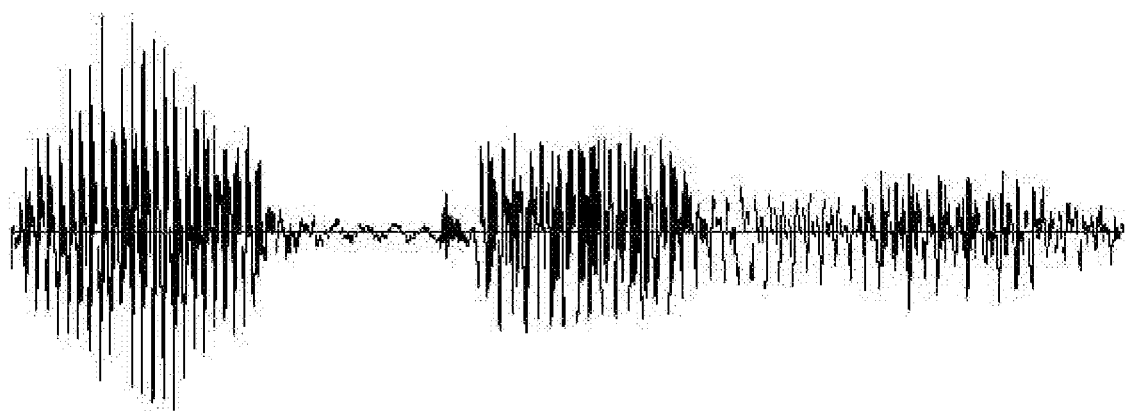
FIG. 5A shows an input audio waveform.

The input to neural speech-to-meaning is speech audio data. It is possible to take in raw time-domain audio samples. FIG. 5A shows a time-domain waveform of a sample of speech.

Figure 5B:
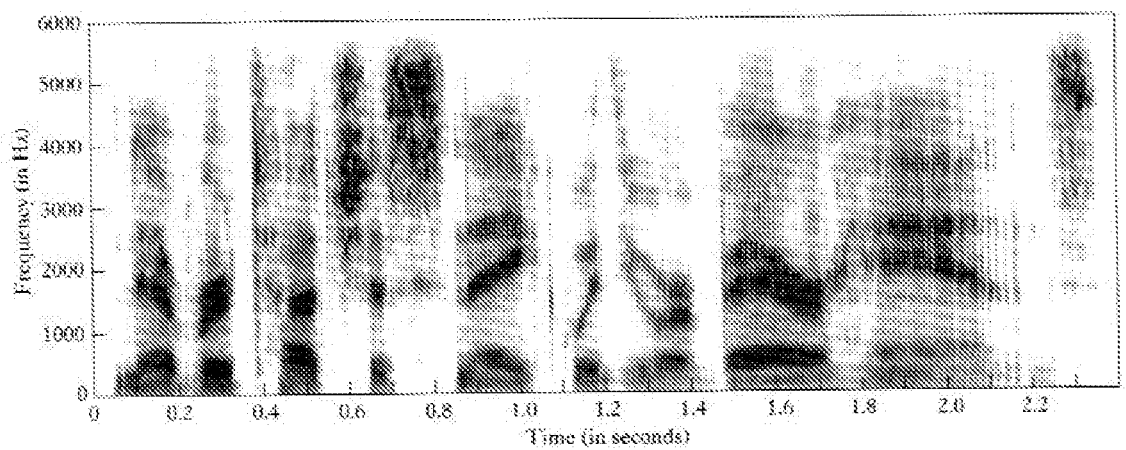
FIG. 5B shows an input audio spectrogram.

Conventional ASR includes a first digital signal processing step of converting time-domain samples to a spectral representation. FIG. 5B shows a spectrogram of speech ("never touch a snake with your bare hands"). It shows the frequency components of speech audio vertically as they vary, per frame, in time horizontally.

Many convention ASR systems compute Mel-frequency Cepstral Coefficients (MFCCs) at roughly a 10 ms frame rate (100 frames per second being somewhat faster than the fastest human rate of phoneme production expected to be recognized) on windows of roughly 25 ms of audio samples. The mel scale is well designed for average human speech, so little useful information is lost by converting raw time-domain audio samples to MFCC coefficients. However, neural networks are good at making inferences from raw data, and MFCC coefficient calculation consumes unnecessary computing performance.

Two approaches to learning are possible.

(1) Use windowing. This attempts to learn an acoustic model directly from a raw waveform and replace the windowing/FFT/log mel filterbank with a convolutional layer like the approach described in the paper "Learning the Speech Front-end With Raw Waveform CLDNNs" by Sainath, et al. (2015). However, this learned speech front end still takes in audio windows of size 25-50 ms, with a shift of 10 ms. It ends up learning similar filterbanks to those traditionally used in speech recognition, which suggests that that's an (almost) optimal feature input. This sort of architecture is relatively common for end-to-end speech recognition systems such as described in the paper "End-to-End Speech Recognition From the Raw Waveform" by Zeghidour, et al. (2018).

It is also possible to use non-overlapping windows. Tüske, et all describe such an approach using a DNN in their paper "Acoustic Modeling with Deep Neural Networks Using Raw Time Signal for LVCSR" (2014). The DNN learns bandpass filters (again showing that the melfb/gammatone seems pretty close to ideal), but with sufficient training data, is able to achieve similar performance as using front end features or unprocessed, non-overlapping input windows.

(2) Send in one sample at a time to a recurrent network. This approach does not require windowing. Acceptable performance requires having enough context to make informed decisions. Some vowels, for example, can be 200 ms long. At 16 kHz sampling rate, that requires memory across 3200 samples. This can be addressed in various ways, such as by using time dilation in an RNN as described by Chang, et al. in the paper "Dilated Recurrent Neural Networks" (2017) or as in CNNs such as used in the Google Wavenet audio generative system.

Improved performance is possible with combinations of the two approaches above. Using context-independent targets can help, by avoiding a need to have a long enough memory to see the previous and next phonemes.

Basic System

Figure 6:
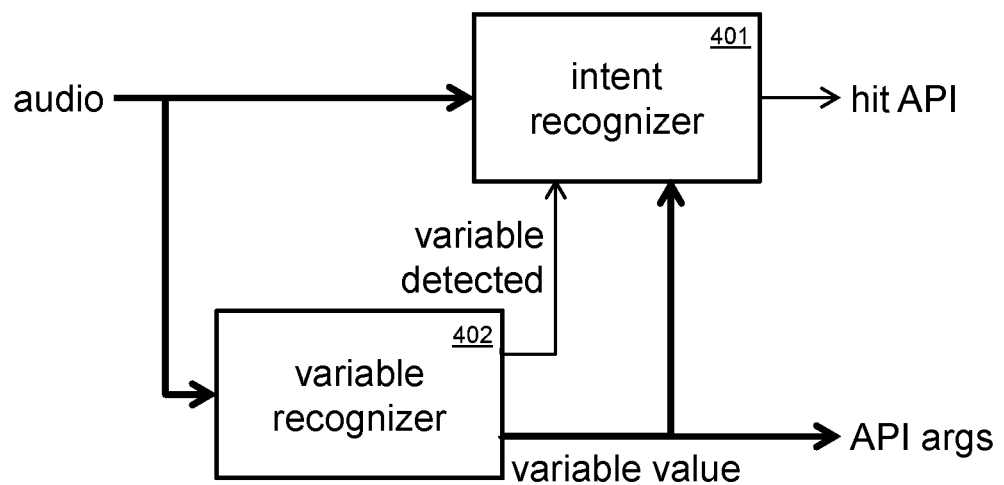
FIG. 6 shows a diagram of some basic recognizer elements.

FIG. 6 shows a high-level view of components of a simple neural speech-to-meaning system. It comprises an intent recognizer 401 and a variable recognizer 402. The intent recognizer is a neural-network-based model that takes in audio that may contain speech and outputs a signal to invoke a request for a virtual assistant action. The intent recognizer issues the request when a probability of the speech audio having the intent reaches a threshold. The level of the threshold may be fixed by design of the system or may be dependent on application, environment, time, or other contextual information.

The request can be a pulse or a continuously varying level. It can be programmed with a kind of hysteresis effect or hold-off timer so that after issuing a request, the intent recognizer will not issue a second request before at least the shortest amount of time in which a user might make a second expression with an intent. Hitting a web API by making transmitting a request over the internet is an example of a virtual assistant action. Sending a signal within a device to cause it to control a motor is another example.

The intent recognizer is trained on a large number of voices for multiple phrasings of the intent, potentially in multiple human languages. A single-user system could be trained by the user speaking each phrasing several times. A system to support any voice might be functional if trained on 50 diverse voices, but a mass production quality system should be trained on many thousands of different voices.

In some systems, intent recognizers run continuously on audio and invoke an API hit whenever an intent is recognized. Alternatively, intent recognizers run only after a phrase spotter detects a wake phrase and they condition their signal of an API hit on an end-of-utterance detection, such as one that recognizes a period of non-speech for a specific duration.

A variable recognizer 402 takes in audio and outputs a signal indicating that it has recognized a known enumerated value for the variable in the audio. The value of the variable provides an argument for an API hit.

The variable detected signal and the value of the variable may be used by intent recognizers as inputs to inform intent detection. This is useful, for example, to cause an intent recognizer to look up the weather when receiving audio of "I don't know the weather in Boston" since Boston would be recognized as a known enumerated value of a city name variable, but prevent the recognizer from performing a weather information request in response to "I don't know whether to stay or go" since no city name appears shortly before or after the important word that sounds like "weather". Accordingly, the output of a request for a virtual assistant action (e.g. API hit) is conditional on the probability of the speech audio having an enumerated variable value.

In some systems, variable recognizers output both a signal that a variable is detected and a timestamp of when it was detected. Intent recognizers may be trained to use the timing of variable recognition relative to currently captured speech to inform intent detection. Another approach is for a variable-dependent intent recognizer to be trained with recurrence or an LSTM layer to compute its intent probability according to a time-delayed peak in a probability value from a variable recognizer. For example, "weather in Boston" and "Boston's weather" trigger a weather intent despite the key information "weather" and "Boston" coming in a different order. However, "in Boston weather" and "weather's Boston" do not trigger the intent because the relative order of the variable name "Boston" compared to the timing of "in" or "'s" is learned as not a hit of the intent.

Virtual assistants based on neural speech-to-meaning typically comprise either multiple discrete intent recognizer networks, each with an API hit trigger or a global intent recognizer network with multiple outputs, an intent recognizer for each API hit trigger.

The system shown in FIG. 6 varies from other "end-to-end" speech-to-text models, or natural language intent inference models in that there is no point in the system at which there is a human-readable transcription of speech. There is no lexical representation of the speech as input, as output, or that could be observed or extracted internally from the system.

Figure 7:
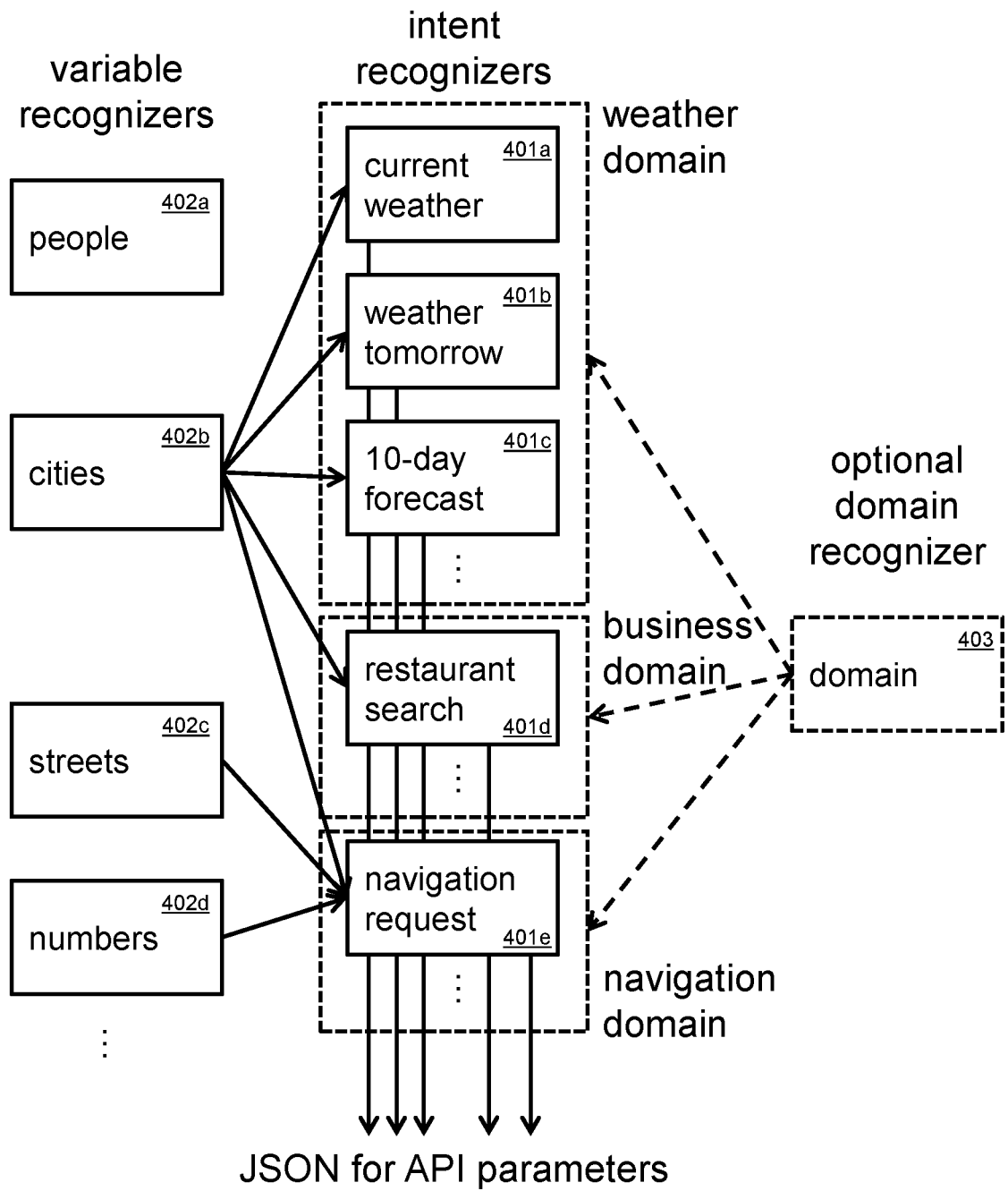
FIG. 7 shows an example of instances of some types of recognizers.

FIG. 7 shows the architecture of a virtual assistant made with neural speech-to-meaning recognizers. Three domains are shown, one for each of weather, business, and navigation. The weather domain has intent recognizers for current weather 401a, weather tomorrow 401b, and 10-day forecast 401c. The business domain has a restaurant search intent recognizer 401d and the navigation domain has a navigation request intent recognizer 401e. Each domain may have other intent recognizers.

The architecture also comprises variable recognizers trained to recognize names of people 402a, names of places 402b, streets 402c, and numbers 402d. The virtual assistant may have other types of variable recognizers. A recognizer for people names would be useful for virtual assistants that support sending messages to people. A variable recognizer for names of cities is useful in conjunction with appropriate intent recognizers for answering queries about weather in specific cities at specific times, searching for restaurants, and performing navigation to specific locations. A variable recognizer for numbers is also useful for navigation requests, such as for navigating to specific addresses.

The virtual assistant architecture of FIG. 7 also comprises a domain recognizer 403. This is trained on recordings of speech labeled by the domain of the speech. Training data is easy to collect and label for a domain recognizer. It can provide a score that is useful to disambiguate or weight the hypothesis scores of hits in various domain-specific intent recognizers.

Some speech-based virtual assistant devices, which perform recognition of intents from input speech audio, also provide responses to users in the form of TTS-synthesized speech audio. Some mobile and direct user devices include a local TTS engine that can produce speech from text received from a server. Some systems perform speech synthesis on a server, using a speech synthesis engine, and provide the speech output as digital audio sent through a network.

Conditional Invocation

For systems that are power sensitive or performance limited, such as mobile devices and data centers, it can be beneficial to avoid running recognizers unnecessarily. Accordingly, it is possible for recognizers to compute probability scores and invoke others, as needed, depending on the score.

For example, an intent recognizer may operate independently of a variable recognizer in a steady state. Upon its score reaching a threshold, the intent recognizer may invoke one or more variable recognizers for variables potentially present in the intent.

For example, a domain recognizer may operate continuously and compute scores for each of many possible domains or individual intents. Upon a score reaching a threshold, the domain recognizer may invoke one or more intent recognizers. The domain recognizer may also invoke variable recognizers, as appropriate.

For example, a variable recognizer may run continuously and compute a probability score. Upon the score reaching a threshold, the variable recognizer may invoke one or more intent recognizers that can depend on the variable. Variable recognizers may invoke intent recognizers based on which of multiple enumerated variables is recognized. This is useful to avoid invoking intent recognizers that do not understand all variable values. It can also be useful for allowing the training of variable recognizers that work across multiple variable types. For example, a single variable recognizer may be trained for points of interest name type variables and street name types variables for London. Closing time of day intents would be invoked only for point of interest values, not street name values. A separate variable recognizer for points of interest and street names would be trained for Paris. Similarly, variable recognizers for multiple variable types may be trained for different spoken languages that specific users use or that is used in locations where specific products are sold.

System Build-Up

The following are procedures involved in creating and enhancing a system capable of neural speech-to-meaning.

Adding an intent—To add an intent to a system, a designer may brainstorm phrasings for the intent and put those phrasings in random order into a system to procure diverse voice data from readers expressing the intent. An open example of such a system is Mozilla Common Voice, in which participants read sentences aloud for their phone or computer to capture their voice. Such a system can be useful to collect a diverse range of voices speaking the various phrasings of a new intent.

Creating a variable recognizer—For each type of variable in an intent, it is necessary to have a variable recognizer. It needs to be able to recognize all supported values of the variable (e.g. names of cities). It is possible to train a variable recognizer from aligned transcribed speech recordings that cover all variable values. It is also possible to collect recordings of specific variable values through a voice recording collection system.

A new intent may use an existing variable recognizer of an appropriate type. However, if the intent can recognize values of the variable not recognized by the variable recognizer, then it may be appropriate to collect new voice recordings for the new variable values. A voice collection system can do this by composing sentences for voice donors to read that replace values of variable words in the sentence with values of the variable that need more voice data to improve training accuracy.

Variable recognizers can be trained independently of intent recognizers but may achieve better performance if trained with the context of usage in actual expressed intents since people speak a word differently alone than in context. Intent recognizers can be trained independently with recordings of intent phrasings. Intent recognizers will learn to ignore the information in the audio recordings expressing variable values as long as it varies significantly between recordings. It would also be fine to zero out or add random noise to the audio sections with specific variable values. Jointly training intent recognizers and their supporting variable recognizers can achieve somewhat faster training to a desired accuracy.

Once in operation, user voice queries can be captured and used to retrain recognizers and thereby improve future accuracy. One possibility is to have human data labelers listen to query audio, look at responses, and simply indicate a true or false signal as to whether the response was appropriate to the query. Another possibility is for the human labelers to listen to query audio and simply indicate which, if any, of a known set of domains the query addresses. Another possibility is for human labelers to listen to the query audio while seeing a display indicating what API was hit and with what arguments and indicate which are wrong and for wrong ones what the correct API hit or argument values should be.

Another possibility is for a system to have a special intent recognizer trained to recognize indications that a previous virtual assistant response was dissatisfactory. Words such as, "no" or "I meant" or an irritated tone of voice can be such indicators. A dissatisfaction recognizer can be used to flag prior expressions as having been likely incorrect and giving those priority for human labeling or other automated procedures for labeling or improving training data.

Creating a neural speech-to-meaning virtual assistant system is very difficult to start but gets better and easier as the system is used, and as data is collected from the usage.

Global and Hybrid Recognizers

One possible approach is to have discrete domain-specific recognizers. This is useful for building modular, configurable virtual assistants. For example, a platform can support configuring a first virtual assistant for a car that supports car control and weather domains but not a cooking domain and a second virtual assistant for a smart speaker that supports weather and cooking domains but not a car control domain. Discrete recognizers also have the benefit of enabling developers to add, remove, and upgrade intent recognition independently without retraining a global model. It requires that each intent output a probability score, the score to be normalized between intents, and a final selection stage for selecting the most probable intent for a natural language expression.

Another approach is to train a global cross-domain intent recognizer. This is useful for minimizing redundancy in application-specific systems. A global intent recognizer has the benefit of being trained for all possible intents and therefore to automatically make the selection of the most probable intent.

Whether a global or discrete approach, the intent recognizer has an output that triggers reacting to the intent. This fulfills the function of an end-of-utterance detector in conventional question-answering virtual assistants.

A hybrid approach is possible in which a global intent recognizer is retrained by holding fixed low-level features and training high-level features for new or improved intents without backpropagation to the held low-level feature weights and biases.

Figure 8:
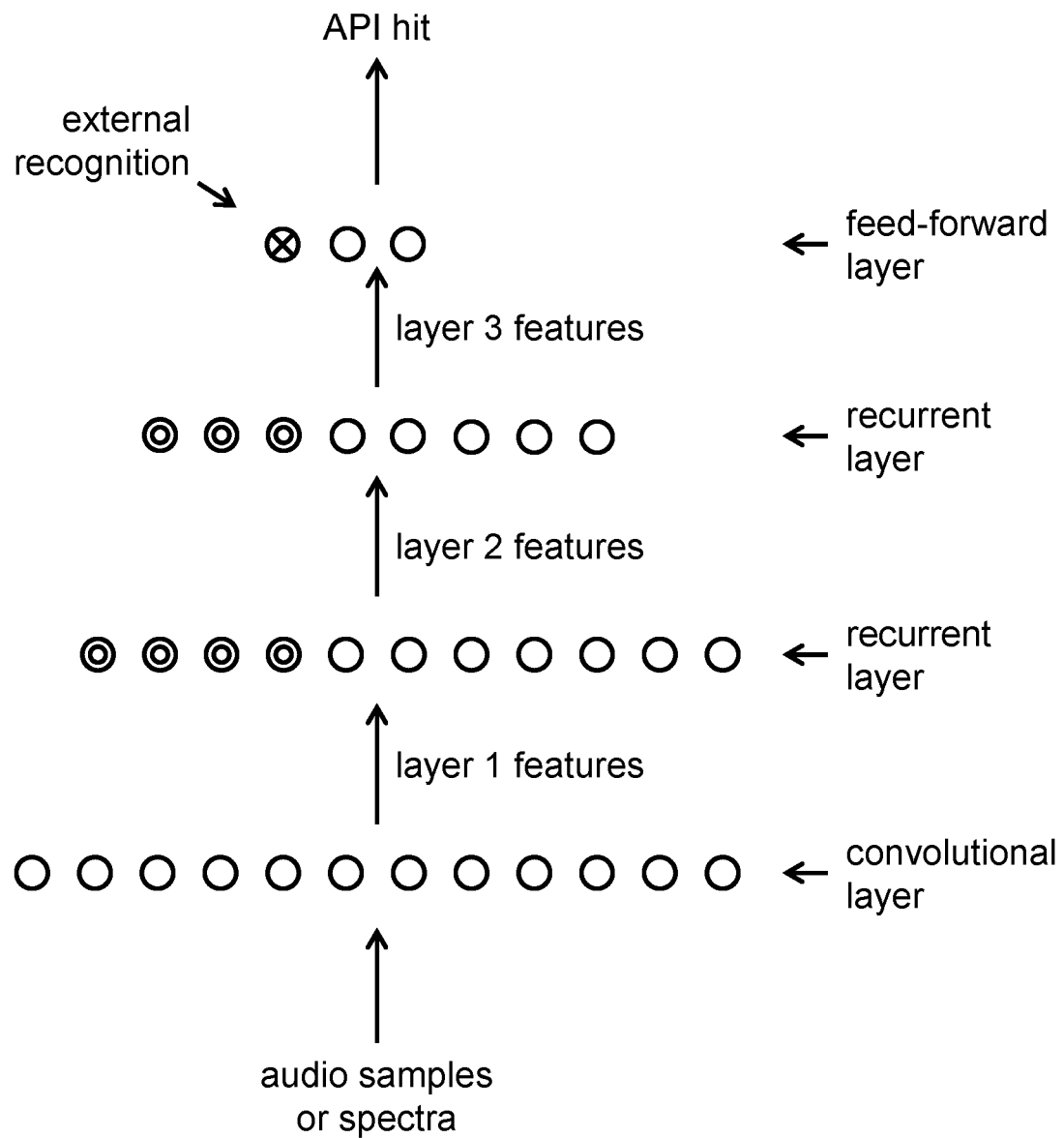
FIG. 8 shows an example of a neural network architecture.

Some approaches to implementing neural speech-to-meaning recognizers are CNN-LSTM-DNN or seq-to-seq or RNN transducer model including attention. FIG. 8 shows an example that has 4 layers and can be used for an intent recognizer. More or fewer layers are possible. It has a lowest input layer that is a convolutional layer that operates on a frame of audio samples or a spectrogram of such. It computes a set of layer-1 feature probabilities. A second layer is a recurrent layer. Recurrent nodes are shown with a double circle. The recurrence may be a long short-term memory (LSTM) type. The layer 2 features are input to a smaller third layer that is also recurrent and also may be an LSTM layer. The layer 3 features are used by a feed-forward layer that takes an input from an external recognizer, shown with an X circle. The external recognition may be from one or more variable recognizers and/or a domain recognizer. In such an architecture, when used as an intent recognizer, the combination of the top layer nodes produces a final output that indicts that an API hit should occur.

This table shows, for one embodiment of a 4-layer neural speech-to-meaning network, for each level of complexity of features, what might be an appropriate analogy in scientific terms and in conventional ASR-NLU system terms.

| Features | Scientific analogy | Conventional ASR-NLU analogy |
|---|---|---|
| input | speech | audio samples |
| layer 1 | vocal formants | mel filter bank activation |
| layer 2 | phonemes | phonemes |
| layer 3 | words | transcription |
| output | meaning | intent |

Independent Variable Recognizers

A similar architecture as that on FIG. 8 is possible for use in a variable recognizer. A convolutional input, recurrence, and some deep feed-forward layers are appropriate. When used as a variable recognizer, there may be many (potentially thousands) output nodes, each representing an enumerated variable value. There may also be a final SoftMax layer, enabling a downstream system to identify a single most-probable variable value.

Some systems run variable recognizers continuously. They use multi-task learning with low layers recognizing common features such as vocal formants and discard irrelevant information such as acoustic information specific to gender and age. Higher layers will tend to be the ones that learn to distinguish between specific variable values.

Though it is possible to train a single recognizer for all variables, which has the benefit of avoiding duplication of computing for low-level features. Configurable and upgradeable systems need frequent retraining of variable recognizers as new values become known, such as new place names or names of new famous people. Some systems separate variable recognizers by type, such as place names, people names, and business names. Some systems separate variable recognizers by geographic location, such as North America and Europe. Some systems separate variable recognizers by language, such as mainland Chinese, Japanese, and English. Some systems separate variable recognizers by application, such as automobiles, smart speakers, and retail businesses.

A variable recognizer for common names of people is useful for intents that require accessing a user's personal contact list. An API handling such an intent needs to receive the recognized name, and perform phonetic matching to a set of multiple known pronunciations of names in the contact list, and return an error signal if the recognized name does not match any name in the address book. In some systems, separate variable recognizers are appropriate for first names and last names.

Jointly Trained Variable Recognizers

It is possible to jointly train an intent recognizer and variable recognizer such as in the paper by Bing Liu (Proceedings of the SIGDIAL 2016 Conference, pages 22-30, Los Angeles, USA, 13-15 Sep. 2016). However, the Liu approach (a) has less coverage while doing beam search since the output space is exponential in the number of possible variable labels; and (b) has no knowledge of a global intent while determining the variables.

A 2-pass approach circumvents the lack of global intent knowledge. A first pass looks at a long amount of time to determine the intent/domain of an entire sentence. A second pass is conditioned on the intent predicted in the first pass. The second pass predicts the values for the variable(s). A 2-pass approach has the disadvantage of requiring processing a complete sentence in the first pass before the second pass can begin, which makes large spikes of processing power demand to run the second pass in order to meet real-time requirements.

A third approach addresses the problems of both of the former approaches while also needing to do only one pass. The third approach splits the conditional probability of variable value prediction from the word/acoustic signal as follows:

$$P(x) = \sum_{Domain} P(x) \sum_{Intent} P(Domain \mid x) P(Intent \mid Domain, x)$$

Since the only concerned is to predict the variable values for the most probable domain and/or intent, this approach converts the summation in the above formula to argmax, thereby yielding the most probable (domain, intent, variable) triplet according to the following equation:

Domain*, Intent*, Variable*=argmax$_{Domain, Intent, variable}$P(Domain|x)P(Intent|Domain, x)P(variable|Domain, Intent, x)

Assuming we have D domains, I average intents per domain and S average variables per intent. The above equation has a complexity of O(DIS), which can be in the thousands. Furthermore, we do this for every feature in our input, thereby bringing the total complexity to O(TDIS) where T is the total number of input time steps. To reduce the complexity, it is possible to do beam search over the domains/intents by considering a beam width of W most probable intents/domains. This brings down the complexity to O(TWS). For practical cases, W can be in the approximate range of 5-20.

While this approach predicts the variables and their values for the W most probable intents, the model keeps refining its intent probability distribution with the ingestion of each input feature. At the end of T time steps, the distribution P(Intent|x) is used as a re-scoring mechanism to re-weight the corresponding variables, thereby making the final output consistent with the intent of the entire sentence.

With this approach, the coverage ratio is W/I rather than $W/K^T$, where W is the beam width, I is the number of distinct intents, K is the number of distinct variables labels from Bing Liu et. al. (2016) and T is the total number of input features. Since $I \ll K^T$, our method has exponentially better coverage than Bing Liu et. al. (2016), while keeping the conditional distribution of the variables computationally tractable.

ASR Recognizers

Some domains require arbitrary text. For example, a domain for sending a dictated text message needs full vocabulary ASR. Text transcription is effectively a special variable recognizer.

Consider training an intent recognizer to send a text message. A system can learn a phrasing in which the text is delimited by "text" at the beginning and "to" at the end. That supports, for example, "text i love you to my mom".

But, to support phrasing such as "text go to the store to my mom" where the word "to" appears in the ASR benefits from using an attention-based model, where the model can look at both ends of the inputs while predicting the labels. The labels can be, for example, MESSAGE_BEGIN, MESSAGE_END, TO_PERSON_BEGIN, and TO_PERSON_END. For this, it is necessary to have the complete sentence and hence is not possible to do in an iterative manner by looking at a word and predicting its label.

Domain Recognizers

Domains are collections of intent recognizers, or single trained recognizers with multiple intent outputs, related to a common data source or similar topic.

To reduce inference-time processing in a system that supports multiple domains, train a domain recognizer to select between domain-specific intent recognizers and only run the one or a small number of domain-specific intent recognizers likely to recognize the speech.

Multilinguality

A benefit of these techniques is that they are language independent. Different spoken languages are just different learned phrasings of intents. Neural translators are essentially encoder-decoders in an embedding space. For a reasonable number of intents, the dimensionality can be much smaller than a full human language-to-language translator.

Figure 9:
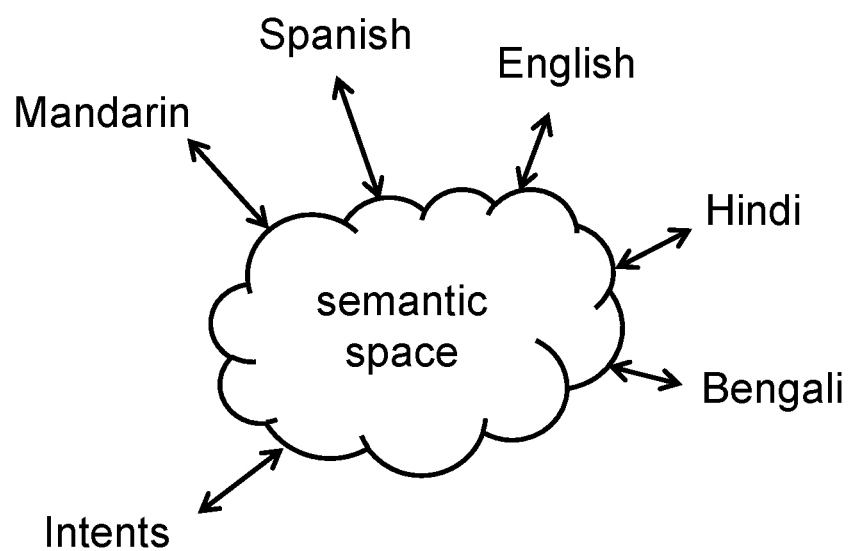
FIG. 9 shows a diagram of translation through a learned semantic space.

The system can use neural translation capabilities where the intent is essentially just another target language for translation. FIG. 9 shows a learned semantic space. Expressions in any spoken language can be mapped to those of another language through the shared semantic space. Likewise, expressions can be mapped to intents as if they are a spoken language.

This has the further surprising effect of allowing creation of a reverse network that can generate grammatically correct audible speech in a human language from a set of intent arguments.

Note that, due to loaned words between language, there is already a lot of overlap of variable recognizers across languages. For example, the word "KFC" and "iPhone" are used in all languages and lists of internationally known musician names are used across languages.

Intent recognizers can learn phrasings in any language using existing semantic-space language translator models. This is practical because virtual assistants only support a tiny number of intents compared to the meanings of all possible sentences in languages. The intent JSON is useful to form an API request with its arguments and to select what API response data values are appropriate to provide to a user.

Quantifying Accuracy

Conventional systems measure word error rate of ASR. There are no industry standard metrics for accuracy of grammar interpretation. Whether an interpretation is correct can be subjective. A more practical measure of accuracy is overall user satisfaction. That is also the most meaningful way to quantify the accuracy of neural speech-to-meaning. Of course, accuracy improves with larger amounts of training data and some data is more useful than other.

Most systems of intent recognizers recognize fewer possible intents than there are possible combinations of words in a spoken expression. Most variable recognizers recognize fewer enumerated values than there are possible combinations of words in a spoken expression. Therefore, the prediction space is much smaller for intent and variable recognizers and therefore much less absolute accuracy is needed to achieve satisfactory performance.

Measuring intent recognizer accuracy is comparable to measuring the accuracy of a phrase spotter in terms of giving false assertions or missing actual expressions. Using neural speech-to-meaning in a system with a phrase spotter and end-of-utterance detector can further improve accuracy by avoiding hit assertions during times of non-usage. Furthermore, after a wake phrase, at an end-of-utterance detection, a system based on neural speech-to-meaning has a delimited segment of speech, known to have a complete expression, on which to operate to determine what intent was expressed, if any.

The Cost of Procuring Data

One of the biggest challenges to bringing up a neural speech-to-meaning system and making it accurate is procuring enough training data and training data that is sufficiently diverse.

Bringing up a system with enough accuracy for user acceptance is relatively easy for a system that starts with a small number of intents and where users have reasonable expectations. For example: a speech-based clock for blind people with one intent; a voice-controlled light bulb with two intents: on and off; or a virtual meteorologist supporting 10 to 20 intents such as a brief or long report for each of a general weather report, temperature report, or precipitation report for each of today, tomorrow, or the next 10 days.

A 20-intent virtual meteorologist can be trained on about 100 carefully chosen phrasings per human language. Though there are more than 100/20=5 possible phrasings per intent in a human language, the use of an LSTM model with attention will recognize the intent from key words in the various phrasings. For example, training on the phrasing "what is today's high temperature" and "tell me the high temperature for today" will recognize almost any other reasonable user phrasing with the speech segments "high temperature" and "today" in either order.

Plenty of volunteers will read, for example, 100 phrases in exchange for a $10 gift certificate. Quality data sources at even less than $10 per 100 phrase readings are available today. From 100 to 1000 voices is probably sufficient to train a 20-intent recognizer with acceptable accuracy. That is a cost of $1000 to $10,000 for training data.

Readers seeing a sequence of phrases with an identifiably similar intent will tend to use unnatural voice styles to avoid the monotony of their task. A training system can randomize the text samples for intents for different types of devices, APIs, or contexts to discourage unnaturalness of reading. Furthermore, a system can randomize variable values within natural sentences to collect speech data for variables.

Some ways to collect "volunteer" readers' voice recordings are through a downloadable phone app, a web page with voice input capability such as Mozilla Common Voice, or by placing noise-insulated recording booths in public places.

Some goofy readers might say something other than the text that they see. Before using the data to train, it is possible to use conventional ASR to check the voice against the text. If a reader gives less than a high percentage, such as 90%, correct readings, their gift certificate is denied.

A speech-based system for a diverse range of users needs to be trained on a diverse set of voices. It is possible to buy targeted advertising, such as through Facebook or Google AdWords, to attract the type of voice recording volunteers needed to diversify the training set. For example, people of one gender are more likely to respond to general notifications of voice recording opportunities, so buying ads targeting groups less likely to respond is a way to ensure a diverse set of training data.

A many-domain virtual assistant might have 100 domains, each with an average of 100 generic intents, each with an average of 10 effective phrasings in each of 10 key languages, each needing 1000 voices for good accuracy. That requires around 1 billion recordings. At an average cost per recording of 0.01 dollars per recording, the virtual assistant can be trained for a mere 10 million dollars.

Domain-specialized assistants can be much less expensive. Single-language virtual assistants can be much less expensive.

Harvesting Data

It is also possible to harvest training data from databases of diverse phrasings. Such databases exist as a result of saving voice utterance data from users of pre-existing virtual assistant systems. Generally, those recordings are especially statistically relevant for training future neural speech-to-meaning virtual assistants. Such systems generally have audio recordings stored with intent data structures or with the ability to immediately reproduce intent data structures.

An ideal data source will include voice recordings that previously yielded incorrect intents and for which a specialist labeled the recordings with the correct intent. A way to facilitate efficient checking is to create a web-based interface for a human to simultaneously listen to speech audio, see the response of the virtual assistant, and type or click an indication of whether it is correct or not. A second stage web page looks at just the data checked as incorrect and provides the audio and a view of several possible correct intents to select and an option to indicate if none are correct or enter in the correct intent if possible.

From a database of checked and labeled clean data, a training process can filter the database by intent to provide training data independently for each intent recognizer.

In comparison to procured clean data, harvested data tends to have more diversity of phrasings. As a result, it can be more valuable for accurate model training, though it can be relatively more expensive because it requires the time of specialists to check and label. Also, it has the cold start problem of the data being available only after a system has been in the field and users have used it.

TTS Generation of Training Data

Another way to produce or augment training data sets, especially to overcome the cold start problem, is to use parametric TTS to generate speech audio for identifiable phrasings using high parameter diversity. This is minimally expensive but must be used for only a portion of the training data set otherwise the training will overfit to attributes of the TTS synthesizer. First generation TTS systems were concatenative. They synthesized speech from recordings of voice donors. Modern TTS uses sets of parameters to define the sound of the voice for generated speech. The parameters are used by a model, such as a generative neural network, to produce speech from text. Parametric TTS systems are becoming more sophisticated, with an ability for greater variation and realism of synthesized speech. This enables TTS to generate more training data, cheaply, without causing the trained model to overfit to attributes of the TTS.

Some domains require variable recognizers that support millions of variable values. This occurs, for example, in an application with an intent for viewing items available at Mall-Mart big box retail superstores that supports phrasings such as "show me <ITEM>" where <ITEM> is a variable that can refer to any one of millions of items in the store inventory. When it is impractical to collect voice recordings reading every one of the item names, it is possible to train a variable recognizer using a data set of speech audio generated by TTS.

Figure 10:
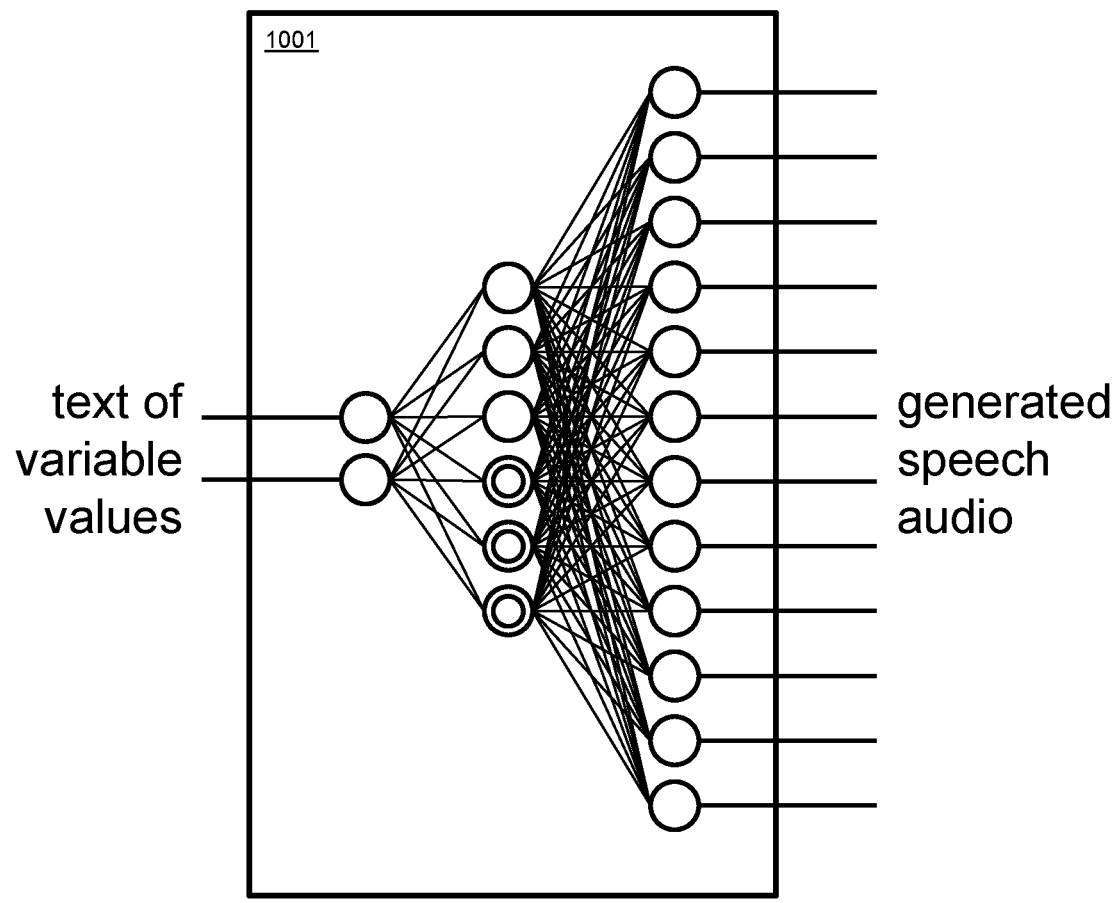
FIG. 10 shows an example generative neural network for producing speech audio.

FIG. 10 shows a diagram of a neural TTS generator 1001. It accepts text of variable values as input. Systems may accept words, letters, or phonemes as input. Systems may accept different numbers of inputs. The TTS generator 1001 uses a neural network with a set of weights to convert the input text to output speech audio. Some hidden nodes of the neural TTS generator are recurrent.

In designing a natural-sounding TTS generator, a primary goal is to learn parameter sets that human listeners assess as sounding natural and pleasant. That is not a primary goal for generating data to train a variable recognizer. It is important to find numerous diverse parameter sets that, taken together, generate speech audio that matches the range of speakers that will use the system.

One approach to accomplishing that is to create a corpus of a diverse range of voices. They may all be saying a specific phrase, such as a wake-phrase for a virtual assistant. The voices may all be saying different phrases. Then:

1. using a voice analysis (e.g. i-vector fingerprinting) algorithm according to relevant features, compute a centroid value for all voice recordings and a range from the centroid that captures all natural voices. It is important that the algorithm not only make sure that the human voice characteristics are present (formant patterns or realistic voiced speech frequency) but also that non-human voice characteristics are not present (e.g. noise or other artifacts that do not occur in human speech).
2. using a basic parametric neural generative TTS engine, generate speech audio for the phrase according to a parameter set
3. analyze the generated speech audio to find its distance from the centroid
4. if the generated audio is beyond the natural range, discard the parameters set
5. else, compute a vector from the centroid to the feature values of the generated speech audio and save the parameter set and its vector value
6. apply a cost function to choosing a next parameter set that favors a great distance from the vectors of saved parameter sets but being within the natural range from the centroid
7. go back to step 1 for many iterations
8. repeat the procedure above for at least a few different specific phrases that cover a broad range of phonemes and diphones.
9. for each variable value that the variable recognizer needs to recognize, for each saved parameter set, generate speech audio as an initial training set for training the variable recognizer.

One approach to training neural speech-to-meaning from TTS is to:
1. determine a multiplicity of words that may be values of a variable in a phrasing of an intent;
2. determine a multiplicity of parameter sets representative of the diversity of voices of users of a virtual assistant;
3. synthesize a multiplicity of speech audio segments for the multiplicity of words, the segments being synthesized according to the multiplicity of parameter sets; and
4. train, using the synthesized speech audio segments, a variable recognizer that is able to compute a probability of the presence of any of the multiplicity of words in speech audio.

It is further possible to train an intent recognizer on segments of speech audio of a phrasing, wherein an input to the intent recognizer is a probability output from the variable recognizer. Optionally, for synthesizing speech, it is possible to do so with respect to adjacent phonetic information in the context of the variable within the phrasing. That is, what words/phonemes come before and after the word. The pronunciation of phonemes are affected by what other phonemes are spoken just before or just after. This happens inadvertently in all languages but specifically by linguistic rules in some languages. The liaison rules of French are one example.

It is also optionally possible to do so with respect to emphasis on the variable within the phrasing. Spoken phrases in natural speech, especially commands, often contain emphasis. The emphasis can be on variable words, to help a listener capture the most relevant information. For example, "how is the weather in AUSTIN" so as not to be confused with "how is the weather in Boston". Emphasis can also be on other words with critical semantic information. For example, "book a flight FROM London TO Hong Kong".

One approach to determining a plurality of parameter sets that represent the diversity of users' voices with minimal bias is the following.
1. procure a multiplicity of speech audio recordings of natural people representative of the diversity of voices;
2. analyze the recordings to compute recorded speech vectors within an embedding space of voice features;
3. compute a region representing a range of recorded speech vectors within the embedding space; and
4. learn the plurality of speech synthesis parameter sets by gradient descent according to a loss function computed by:
   4a. synthesizing speech segments according to parameter sets in the plurality of parameter sets;
   4b. analyzing the synthesized speech segments to compute synthesized speech vectors in the space; and
   4c. computing a loss in proportion to the clustering of the synthesized speech vectors within the space.

Loss in proportion to clustering means favoring learning a multiplicity of parameter sets that generate an approximately even distribution of voice sounds. This avoids bias towards certain speaker types and minimizes the amount of data needed to train an accurate model.

With the well-trained set of speech synthesis parameter sets, it is possible to synthesize segments of speech of one or more enumerated words according to the speech synthesis parameter sets; and use that to train a variable recognizer, wherein the training data includes the synthesized segments of speech of the enumerated word. Training data may also include other data samples.

Embedding spaces are generally learned. However, they can be also be chosen according to parameters that engineers or scientists know to be relevant.

In generating parameter sets, synthesizing audio, and analyzing it to compute its embedding vector, it is possible for some parameter sets to generate speech that falls outside the range of natural voices. In such cases, it would be reasonable to simply discard such parameter sets.

To avoid learning parameter sets too tightly constrained to the data set of natural voices used to learn the range of allowable voices, it is reasonable to add some margin around the region. Parameter sets that synthesize audio segments that fall within the region, including its margin, should not be discarded. They should be used to train a recognizer model that captures unusual voices.

Hybrids of the above approaches to generating training date by TTS are possible, as are approaches that are generally similar to application-specific variations.

Platform Infrastructure

Some companies provide platforms that provide virtual assistant capability for a diverse range of devices. They also provide access to a diverse range of data source domains and action capability domains. The more domains a platform supports, the more useful it is to devices users and the more device users connect to the platform, the more valuable it is for third-party domain providers to provide content through the platform. A competitive virtual assistant platform provider needs to continuously grow to support ever more domain intents that can access ever more types of data through ever more types of devices.

Such platforms will typically provide certain built-in variable recognizers for variables likely to be used in many domain intents such as numbers and location names. Platforms will also host many more intent recognizers than variable recognizers as there is typically one or many intent recognizers for each domain and can be thousands of third-party domain providers providing their data and action capability services through the platform. It is also possible to have domain-specific variable recognizers, such as one to recognize the names of products available at a specific retailer.

Figure 11:
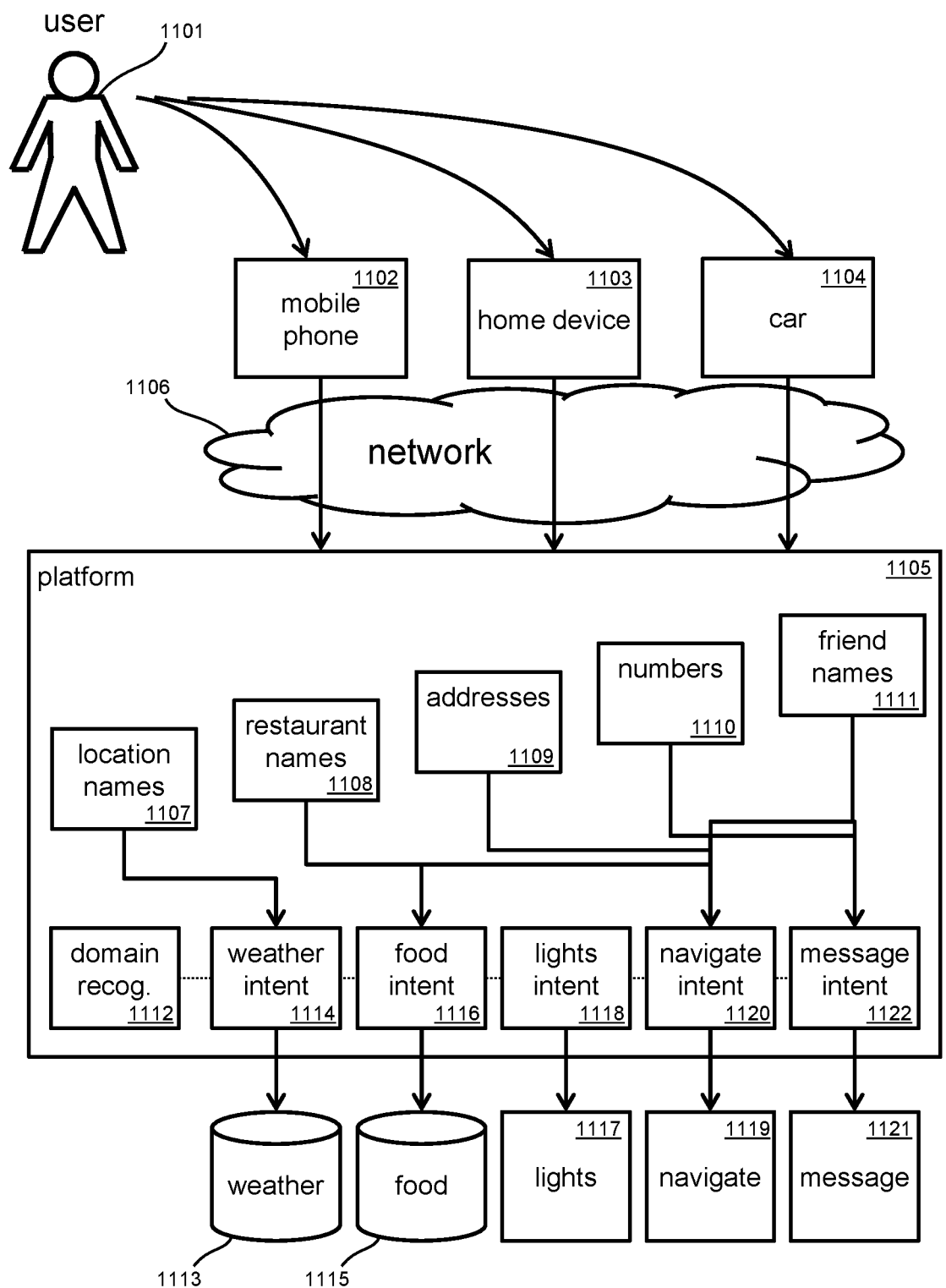
FIG. 11 shows a diagram of an example platform ecosystem for speech-controlled systems.

FIG. 11 shows an example of a very small platform used by one or more user 1101. The one or more user accesses the domain by voice commands through devices such as a mobile phone 1102, home device 1103, or car 1104. The devices are able to access a platform 1105 through a network 1106 such as the Internet or a 5G mobile device network. The platform 1005 may be provided by a separate company from the device makers and network provider.

The devices send recordings or streams of digital audio containing speech to the platform. The platform provider offers built-in common variable recognizers such as ones for location names 1107, restaurant names 1108, addresses, 1109, numbers, 1110.

Some platforms may build user-specific variable recognizers such as a recognizer for friend names 1111 that uses data within a user's contact list and trains from recordings of the user voice and known audio segments of names with the same lexical spelling.

Some platforms may offer domain-specific variable recognizers either provided by domain providers or trained by the platform provider using voice data for recognizable variable values from the domain provider. FIG. 11 does not show a domain-specific variable recognizer.

The platform 1105 also contains a domain recognizer 1112. It is trained on known or labeled domain-specific speech recordings. It predicts, for incoming speech audio, which domain intent is correct for recognizing the query. Platforms may use this to condition the running or assertion acceptance of intent recognizers or to rescore intent recognizer hypotheses. This improves accuracy of the platform and therefore the user experience, especially when the platform provides responses to poorly trained intent recognizers for some third-party domains.

Domain providers provide the per-domain intent recognizers. The domain provider, perhaps in conjunction with the platform provider, trains the recognizer models for the intents for which their domains can respond. In the system of FIG. 11, a weather information domain provider with weather data 1113 enables hits to its API when an intent recognizer 1114 asserts a hit. The weather provider API hit receives a location name value from the location name variable recognizer 1107. A CURL request to the API only occurs if the location name recognizer asserts a valid location name during the period of time that audio is received that triggers the weather intent recognizer. Similarly, a food information provider with food data 1115 receives API hits triggered by a food intent recognizer 1116 that is conditioned on valid restaurant names from the restaurant names variable recognizer 1108.

A provider of smart lightbulbs 1117 enables them to be controlled by the speech-to-meaning platform when a lights intent recognizer 1118 triggers an API hit. The light intent API and its recognizer require no input from variable recognizers since the functions of a lightbulb require no information other than an ability to turn on and off and shine brighter or dimmer.

A navigation command provider 1119 sends navigation control and information to user devices such as a mobile phone 1102 or car 1104 but not a home device 1103. The navigation domain API access is controlled by a navigation intent recognizer 1120 that requires exactly one of a restaurant name, address, or friend name variable.

A domain with an ability to send messages 1121 is controlled by API hits triggered by a message intent recognizer 1122. It requires a valid friend name variable as a destination for the message. It also requires message text, which can optionally include numbers. It can also include any arbitrary text recognized as a transcription using a general automatic speech recognition function. That is not shown in FIG. 11.

Developers of client devices such as mobile phones, home devices, and cars, can choose, through the platform, which domains they can access and, as a result, which intent recognizers should run for queries from their devices. This is useful because, for example, a home device cannot perform navigation and therefore need not recognizer navigation intents.

Complementing a Grammar-Based System

It is possible to bootstrap a neural-based approach using existing data from a grammar-based system by analyzing a large database of queries, grammar parsing each to find its general intent, and producing a list of intents ordered by frequency. Next, replace variable values with tags (e.g. CITY and NUMBER)

Example: "what's the weather in <CITY>"
Example: "what's <NUMBER> plus <NUMBER>"

Then, for the most frequent general intents, find the various phrasings that users used to produce the intents, and use the query audio for that intent as training data for the intent recognizer.

For variable recognizers, search trusted transcriptions for instances matching variable values to be learned. Use trimmed, aligned audio segments for learning each variable value.

Queries that have trusted grammar interpretations are useful as training data. Queries known to be ungrammatical are also useful as negative training examples. As a neural speech-to-meaning recognizer is retrained on ever more data, it becomes able to accurately calculate intent hypotheses for phrasings that do not appear in the grammar. This can be used to provide feedback to grammar writers to assist in improving their grammars. This is especially useful for adding new understanding capability to a system quickly. A grammar developer does their best to anticipate phrasings, and after some time of use in the wild, the system gives the grammar developer feedback to improve the grammars.

A hybrid system with multiple weighted grammars corresponding to different intents can compute intent hypothesis scores from the various grammars, according to weights, to guess the most probable intent. Simultaneously, the system can compute intent hypothesis scores using a neural model. The final intent decision can be based on a weighted average between the grammar-based and neural-based scores.

It is also possible to use grammars to generate sentences that match the grammar. Applying TTS to such sentences can produce training audio segments as described above. A diverse range of TTS parameters and generated sentence phrasings can create a very accurate neural speech-to-meaning intent recognizer.

Conversation State

When a hit is triggered, a neural speech-to-meaning system may store a record of a variable type and its value used in an API hit or other resulting action. There may be multiple stored variable types and values such as a place name, a time, a person name, a male person name, and a female person name. The collection of past mentioned variables and values is known as conversation state.

Intent recognizers may be trained on speech that includes pronouns or other linguistic indicators of references to past semantic information. For example, in English, the word "there" refers to a past mentioned place such as, "Let's go there" following a previous sentence "Where is the nearest ice cream shop". The word "then" can refer to a past mentioned time. The words "him", "her", "he", and "she" refer to past mentioned people.

Old conversation state information may be discarded after an amount of time after which a person would likely forget it in a conversation. Alternatively, conversation state information may be discarded after a certain number of conversation turns. Furthermore, whenever a new value of a variable type is recognized, the previously stored value for that type of variable must be discarded because pronouns in human conversations only refer to the most recent value of any variable type.

Systems may also replace conversation state information not just with new variable values recognized in user speech, but also with values used to provide responses to users from information in API responses. For example, if a virtual assistant provides a user response saying, "The nearest ice cream shop is just 3 blocks up the street.", the system will store a PLACE variable value of "3 blocks up the street".

Some systems store a single conversation state history for each user conversation. Accordingly, a geography query, "What is the population of New York?", followed by a weather query, "What's the weather there?" will use the value "New York" for the location slot of the weather query.

Some systems store a conversation state history for each domain. Accordingly, a query history such as, "Where's the nearest bagel shop?", "How many bagel shops are there in Pocatello?", "Give me directions there." will give directions to the nearest bagel shop, not directions to Pocatello.

One approach to recognizing when to use information stored in conversation state rather than a variable value is to train a model on conversational audio labeled with pronouns and pointers to their referents. The specific referents are not of interest, but training to identify pronouns and pointers to arguments in the specific intents of previous queries is important to learn features that indicate such a look-up requirement. Training can include both previous specific intents and responses that went from the machine to the user since pronouns can refer to semantic information in the response, not just from prior queries.

A neural Turing machine approach, such as the one by Graves (arXiv:1410.5401v2 [cs.NE] 10 Dec. 2014), is also possible. A neural Turing machine can store and retrieve information (probabilistically) in a memory as indicated by an attention mechanism.

Linguistic Complexities

The following considerations are not essential for a system to achieve high user satisfaction. A large majority (99% or more) of queries to virtual assistants are linguistically simple and would not benefit from the considerations below. However, supporting linguistically complex queries is a selling point for some virtual assistants. The following are some challenging cases and how to handle them.

NEGATIVES—One approach is to train a variable recognizer for negation words (e.g. "not", "except", "without"). Based on the time of the word correspondingly just before (for some languages such as English) or after (for some other languages) the negation word relative to the verb feature of a query, the output intent gets a negation indicator in the intent. The negative indicator may be passed along with an API request if supported by the API protocol. It also may be used to condition or filter a response from an API hit.

Another approach is to train with data samples that have negation. It is possible to synthesize examples with negation from human recorded speech data or TTS-generated data.

DOUBLE NEGATIVES AND MID-SENTENCE CORRECTIONS—This is not a major concern because they are rare, and users will understand why a response is nonsensical.

COMPOUND QUERIES—It is possible to train a query boundary recognizer from labeled audio or from synthesized single queries. For the English language, the word "and" will tend to emerge as a highly weighted feature for discerning compound queries.

CRMs

Figure 12A:
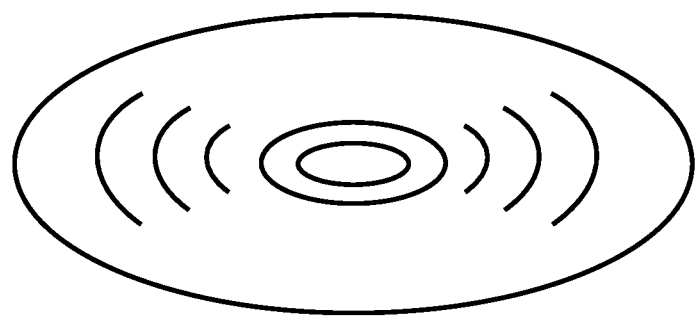
FIG. 12A shows a rotating non-transitory computer-readable medium.

FIG. 12A shows an example non-transitory computer readable medium that is a rotating magnetic disk. Data centers commonly use magnetic disks to store data and code comprising instructions for server processors. The magnetic disk stores code comprising instructions that, if executed by one or more computers, would cause the computer to perform steps of methods described herein. Rotating optical disks and other mechanically moving storage media are possible.

Figure 12B:
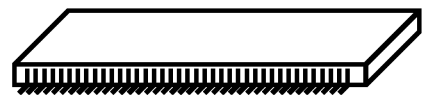
FIG. 12B shows a solid-state non-transitory computer-readable medium.

FIG. 12B shows an example non-transitory computer readable medium that is a Flash random access memory (RAM) chip. Data centers commonly use Flash memory to store data and code for server processors. Mobile devices commonly use Flash memory to store data and code for processors within system-on-chip devices. The Flash RAM chip stores code comprising instructions that, if executed by one or more computers, would cause the computer to perform steps of methods described herein. Other non-moving storage media packaged with leads or solder balls are possible.

Various types of computer-readable media are appropriate for storing code comprising instructions according to various embodiments.

The SoC

Figure 13A:
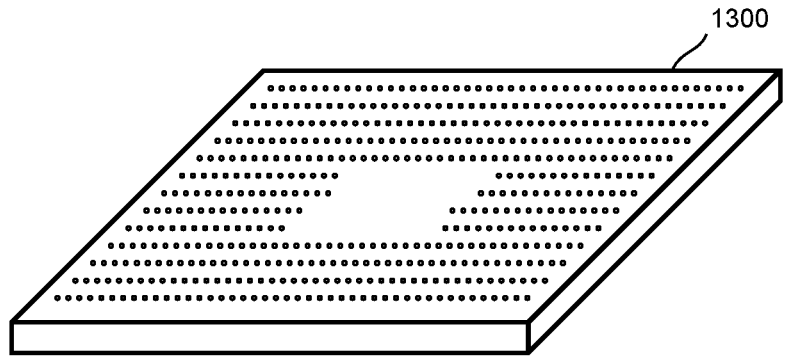
FIG. 13A shows a packaged system-on-chip device.

FIG. 13A shows the bottom side of a packaged system-on-chip device 1300 with a ball grid array for surface-mount soldering to a printed circuit board. Various package shapes and sizes are possible for various chip implementations. System-on-chip (SoC) devices control many embedded systems embodiments as described herein.

Figure 13B:
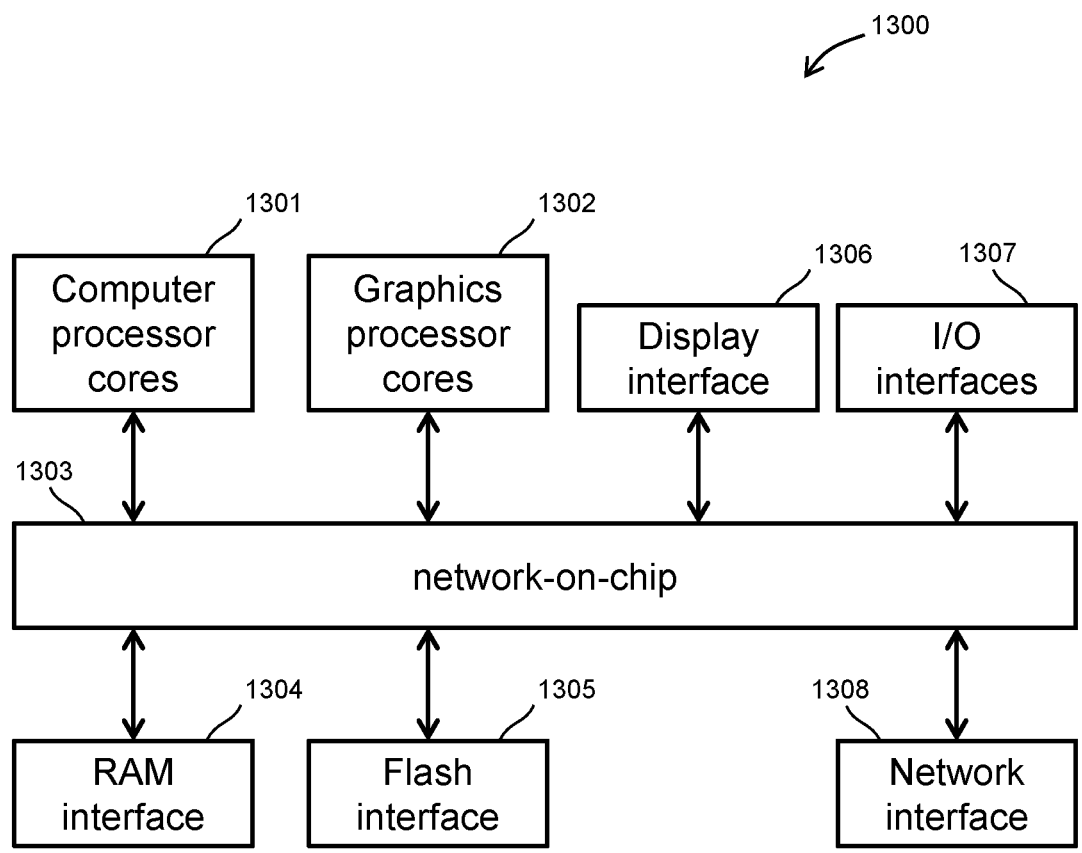
FIG. 13B shows a high-level functional block diagram of an example system-on-chip.

FIG. 13B shows a block diagram of the system-on-chip 1300. It comprises a multicore cluster of computer processor (CPU) cores 1301 and a multicore cluster of graphics processor (GPU) cores 1302. The processors connect through a network-on-chip 1303 to an off-chip dynamic random access memory (DRAM) interface 1304 for volatile program and data storage and a Flash interface 1305 for non-volatile storage of computer program code in a Flash RAM non-transitory computer readable medium. SoC 1300 also has a display interface 1306 for displaying a GUI and an I/O interface module 1307 for connecting to various I/O interface devices, as needed for different peripheral devices. The I/O interface enables sensors such as touch screen sensors, geolocation receivers, microphones, speakers, Bluetooth peripherals, and USB devices, such as keyboards and mice, among others. SoC 1300 also comprises a network interface 1308 to allow the processors to access the Internet through wired or wireless connections such as WiFi, 3G, 4G long-term evolution (LTE), 5G, and other wireless interface standard radios as well as Ethernet connection hardware. By executing instructions stored in RAM devices through interface 1304 or Flash devices through interface 1305, the CPUs 1301 and GPUs 1302 perform steps of methods as described herein.

The Server

Figure 14A:
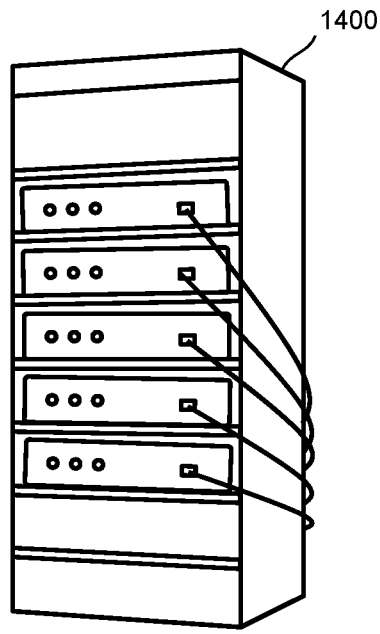
FIG. 14A shows a server blade system.

FIG. 14A shows a rack-mounted server blade multi-processor server system 1400 according to some embodiments. It comprises a multiplicity of network-connected computer processors that run software in parallel.

Figure 14B:
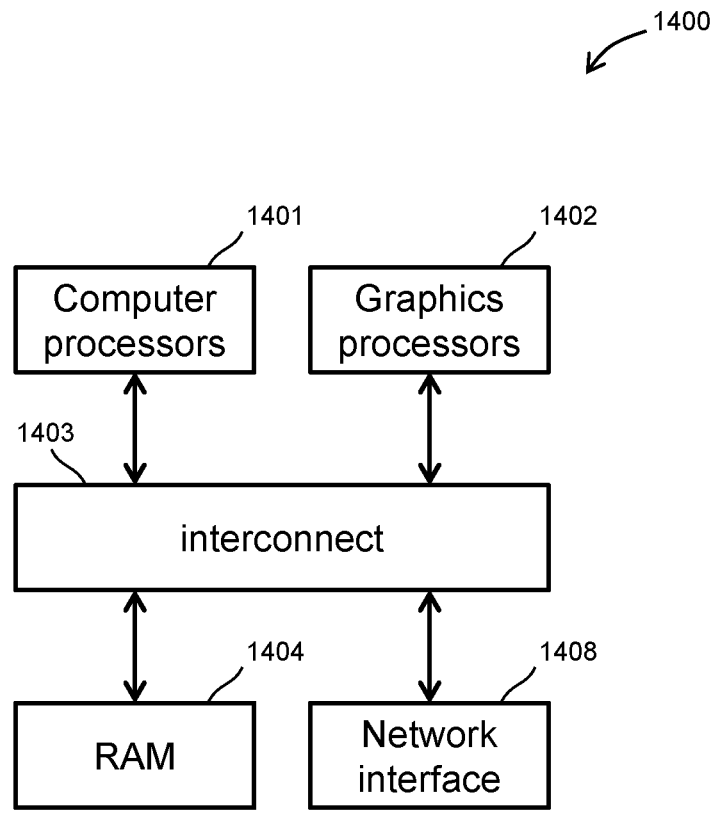
FIG. 14B shows a high-level functional block diagram of an example server architecture.

FIG. 14B shows a block diagram of the server system 1400. It comprises a multicore cluster of computer processor (CPU) cores 1401 and a multicore cluster of graphics processor (GPU) cores 1402. The processors connect through a board-level interconnect 1403 to random-access memory (RAM) devices 1404 for program code and data storage. Server system 1400 also comprises a network interface 1408 to allow the processors to access the Internet. By executing instructions stored in RAM devices 1404, the CPUs 1401 and GPUs 1402 perform steps of methods as described herein.

Special Boilerplate

Examples shown and described use certain spoken languages. Various embodiments operate, similarly, for other languages or combinations of languages. Examples shown and described use certain domains of knowledge. Various embodiments operate similarly for other domains or combinations of domains.

Some embodiments are screenless, such as an earpiece, which has no display screen. Some embodiments are stationary, such as a vending machine. Some embodiments are mobile, such as an automobile. Some embodiments are portable, such as a mobile phone. Some embodiments are for implanting in a human body. Some embodiments comprise manual interfaces such as keyboards or touchscreens. Some embodiments comprise neural interfaces that use human thoughts as a form of natural language expression.

Some embodiments function by running software on general-purpose programmable processors (CPUs) such as ones with ARM or x86 architectures. Some power-sensitive embodiments and some embodiments that require especially high performance such as for neural network training use hardware optimizations. Some embodiments use application-customizable processors with configurable instruction sets in specialized systems-on-chip, such as ARC processors from Synopsys and Xtensa processors from Cadence. Some embodiments use dedicated hardware blocks burned into field programmable gate arrays (FPGAs). Some embodiments use arrays of graphics processing units (GPUs). Some embodiments use application-specific-integrated circuits (ASICs) with customized logic to give best performance. Some embodiments are in hardware description language code such as code written in the language Verilog.

Some embodiments of physical machines described and claimed herein are programmable in numerous variables, combinations of which provide essentially an infinite variety of operating behaviors. Some embodiments herein are configured by software tools that provide numerous parameters, combinations of which provide for essentially an infinite variety of physical machine embodiments of the invention described and claimed. Methods of using such software tools to configure hardware description language representations embody the invention described and claimed. Physical machines can embody machines described and claimed herein, such as: semiconductor chips; hardware description language representations of the logical or functional behavior of machines according to the invention described and claimed; and one or more non-transitory computer readable media arranged to store such hardware description language representations.

Hardware blocks, custom processor instructions, co-processors, and hardware accelerators perform neural network processing or parts of neural network processing algorithms with particularly high performance and power efficiency. This provides long battery life for battery-powered devices and reduces heat removal costs in data centers that serve many client devices simultaneously.

General Boilerplate

Practitioners skilled in the art will recognize many modifications and variations. The modifications and variations include any relevant combination of the disclosed features.

Various embodiments are methods that use the behavior of either or a combination of humans and machines. Some embodiments are systems of one or more non-transitory computer readable media arranged to store such instructions for methods described herein. Some embodiments are physical devices such as semiconductor chips; hardware description language representations of the logical or functional behavior of such devices; and one or more non-transitory computer readable media arranged to store such hardware description language representations.

Descriptions herein reciting principles, features, and embodiments encompass both structural and functional equivalents thereof.

What is claimed is:

1. A machine for recognizing an intent in speech audio, the machine comprising:
   a variable recognizer that processes speech audio features, computes a probability of the speech audio having any of a plurality of enumerated variable values, and outputs the value of the plurality of enumerated variable values with the highest probability; and
   an intent recognizer that processes speech audio features, computes a probability of the speech audio having the intent, and in response to the probability being above an intent threshold, produces a request for a virtual assistant action,
   wherein the machine has no lexical representation of the speech audio;
   the variable recognizer indicates the probability of the speech audio having a value from the plurality of enumerated variable values;
   the intent recognizer conditions its output of a request for an action on the probability of the speech audio having a value from the plurality of enumerated variable values; and
   the conditioning is based on a delayed indication of the probability of the speech audio having a value from the plurality of enumerated variable values.

2. The machine of claim 1 wherein the intent recognizer conditions its output of a request for an action on which value of the plurality of enumerated variable values has the highest probability.

3. The machine of claim 2 wherein the conditioning is based on a delayed indication of which value of the plurality of enumerated variable values has the highest probability.

4. The machine of claim 1 wherein one of the recognizers produces a score and the other recognizer is called in response to the score being above a score threshold.

5. The machine of claim 1 further comprising a domain recognizer that processes speech audio features and computes a probability of the speech audio referring to a specific domain, wherein the intent recognizer is associated with the domain and called in response to the probability of the speech audio referring to a specific domain being above a domain threshold.

6. The machine of claim 1 wherein no human-readable speech transcription is computed.

7. The machine of claim 1 further comprising a network client with access to a web application programming interface (API), wherein, in response to the intent recognizer producing a request for a virtual assistant action, the network client performs a request to the web API, the request having, as an argument, the value output by the variable recognizer.

8. The machine of claim 7 further comprising a speech synthesis engine, wherein, in response to receiving a response from the web API, the speech synthesis engine synthesizes speech audio containing information from the web API response and outputs the synthesized speech audio for a user of the virtual assistant.

9. A method of recognizing an intent from speech audio by a computer system, the method comprising:
obtaining speech audio;
processing features of the speech audio to compute a probability of the speech audio having any of a plurality of enumerated variable values that are numbers;
outputting the value of the plurality of enumerated variable values with the highest probability;
processing the features of the speech audio to compute a probability of the speech audio having the intent; and
in response to the probability being above an intent threshold, outputting a request for a virtual assistant action,
wherein outputting a request is conditioned on the probability of the value of the plurality of enumerated variable values with the highest probability; and
the conditioning is based on a delayed indication of the probability of the speech audio having a value from the plurality of enumerated variable values.

10. The method of claim 9 wherein outputting a request is conditioned on which value of the plurality of enumerated variable values has the highest probability.

11. The method of claim 10 wherein an indication of the value of the plurality of enumerated variable values is delayed.

12. The method of claim 9 wherein one of the probability computations is performed in response to the other probability computation having a result that is above a threshold.

13. The method of claim 9 further comprising processing features of the speech audio to compute a probability of the speech audio referring to a specific domain, wherein the intent is associated with the domain and computing the probability of the speech audio having the intent is performed in response to the probability of the speech audio referring to the domain being above a threshold.

14. The method of claim 9 wherein no human-readable speech transcription is computed.

15. The method of claim 9 wherein outputting a request for a virtual assistant action is performed by making a request to a web API, the request having as an argument, the value with the highest probability.

16. The method of claim 15 further comprising receiving a response from the web API; and synthesizing speech audio containing information from the web API response.

17. A non-transitory computer readable medium storing code capable of causing one or more computer processors to recognize an intent from speech audio by:
obtaining speech audio;
processing features of the speech audio to compute a probability of the speech audio having any of a plurality of enumerated variable values that are numbers;
outputting the value of the plurality of enumerated variable values with the highest probability;
processing the features of the speech audio to compute a probability of the speech audio having the intent; and
in response to the probability being above an intent threshold, outputting a request for a virtual assistant action,
wherein outputting a request is conditioned on the probability of the value of the plurality of enumerated variable values with the highest probability; and
the conditioning is based on a delayed indication of the probability of the speech audio having a value from the plurality of enumerated variable values.

18. The medium of claim 17 wherein outputting a request is conditioned on which value of the plurality of enumerated variable values has the highest probability.

19. The medium of claim 18 wherein an indication of the value of the plurality of enumerated variable values is delayed.

20. The medium of claim 17 wherein one of the probability computations is performed in response to the other probability computation having a result that is above a threshold.

21. The medium of claim 17 further comprising processing features of the speech audio to compute a probability of the speech audio referring to a specific domain, wherein the intent is associated with the domain and computing the probability of the speech audio having the intent is performed in response to the probability of the speech audio referring to the domain being above a threshold.

22. The medium of claim 17 wherein no human-readable speech transcription is computed.

23. The medium of claim 17 wherein outputting a request for a virtual assistant action is performed by making a request to a web API, the request having as an argument, the value with the highest probability.

24. The medium of claim 23 further comprising receiving a response from the web API; and synthesizing speech audio containing information from the web API response.

* * * * *